US007328429B2

(12) United States Patent
Hooper et al.

(10) Patent No.: US 7,328,429 B2
(45) Date of Patent: Feb. 5, 2008

(54) INSTRUCTION OPERAND TRACING FOR SOFTWARE DEBUG

(75) Inventors: Donald F. Hooper, Shrewsbury, MA (US); Eric Walker, Lancaster, MA (US)

(73) Assignee: Intel Corporation, Santa Clara, CA (US)

( * ) Notice: Subject to any disclaimer, the term of this patent is extended or adjusted under 35 U.S.C. 154(b) by 661 days.

(21) Appl. No.: 10/713,332

(22) Filed: Nov. 13, 2003

(65) Prior Publication Data

US 2005/0108689 A1 May 19, 2005

(51) Int. Cl.
G06F 9/44 (2006.01)

(52) U.S. Cl. .................. 717/128; 717/135; 712/227; 703/13; 703/22

(58) Field of Classification Search ........ 717/124–135; 712/216, 227, 245; 703/13–16, 20–22
See application file for complete search history.

(56) References Cited

U.S. PATENT DOCUMENTS

| | | | | |
|---|---|---|---|---|
| 3,698,007 | A | * | 10/1972 | Malcolm et al. ............ 703/20 |
| 4,730,315 | A | * | 3/1988 | Saito et al. ................ 714/38 |
| 4,819,234 | A | * | 4/1989 | Huber ...................... 717/129 |
| 4,879,646 | A | * | 11/1989 | Iwasaki et al. ............. 712/227 |
| 4,951,195 | A | * | 8/1990 | Fogg et al. ................. 703/20 |
| 5,148,538 | A | * | 9/1992 | Celtruda et al. ............ 711/205 |
| 5,167,023 | A | * | 11/1992 | de Nicolas et al. .......... 703/27 |
| 5,168,554 | A | * | 12/1992 | Luke ........................ 715/509 |
| 5,301,302 | A | * | 4/1994 | Blackard et al. ........... 703/20 |
| 5,333,283 | A | * | 7/1994 | Emma et al. ............... 712/236 |
| 5,446,876 | A | * | 8/1995 | Levine et al. .............. 714/47 |
| 5,564,028 | A | * | 10/1996 | Swoboda et al. .......... 712/227 |
| 5,761,474 | A | * | 6/1998 | Lesartre et al. ............ 712/217 |
| 5,784,552 | A | * | 7/1998 | Bishop et al. ............... 714/38 |
| 5,857,077 | A | * | 1/1999 | Nakagaki et al. .......... 709/238 |
| 5,862,336 | A | * | 1/1999 | Nakagaki et al. .......... 709/224 |
| 5,881,288 | A | * | 3/1999 | Sumi et al. ................ 717/125 |
| 5,896,536 | A | * | 4/1999 | Lindsey .................... 717/128 |
| 5,964,893 | A | * | 10/1999 | Circello et al. ............. 714/39 |
| 5,974,538 | A | * | 10/1999 | Wilmot, II ................ 712/218 |

(Continued)

OTHER PUBLICATIONS

Ramamoorthy et al., "Pipeline Architecture," 1977, ACM, p. 61-102.*

(Continued)

*Primary Examiner*—Wei Zhen
*Assistant Examiner*—Qing Chen
(74) *Attorney, Agent, or Firm*—Daly, Crawford, Mofford & Durkee LLP

(57) ABSTRACT

A tool that enables a user to perform instruction operand tracing during debug is presented. While executing microcode on a simulator, a history of register and memory values is saved. A graphic user interface uses these values to present a view of the microcode in a thread history. The user can use the thread history to select any given cycle time of the simulation, and switch over to a thread window (or code list view). The instruction that executed at the cycle of interest is marked in the code list view, and right-clicking on the code line, the user is given options, including an option to jump backward in time to the code line where a source variable was set and/or the option to jump forward in time to a code line that used a result variable.

22 Claims, 18 Drawing Sheets

U.S. PATENT DOCUMENTS

| | | | |
|---|---|---|---|
| 5,978,584 A * | 11/1999 | Nishibata et al. | 717/134 |
| 6,009,270 A * | 12/1999 | Mann | 717/128 |
| 6,021,261 A * | 2/2000 | Barrett et al. | 714/37 |
| 6,083,281 A * | 7/2000 | Diec et al. | 717/128 |
| 6,088,790 A * | 7/2000 | Grochowski | 712/218 |
| 6,230,114 B1 * | 5/2001 | Hellestrand et al. | 703/13 |
| 6,240,544 B1 * | 5/2001 | Kaneko | 717/135 |
| 6,263,302 B1 * | 7/2001 | Hellestrand et al. | 703/17 |
| 6,282,701 B1 * | 8/2001 | Wygodny et al. | 717/125 |
| 6,434,741 B1 * | 8/2002 | Mirani et al. | 717/124 |
| 6,463,553 B1 * | 10/2002 | Edwards | 714/38 |
| 6,487,683 B1 * | 11/2002 | Edwards | 714/38 |
| 6,487,715 B1 * | 11/2002 | Chamdani et al. | 717/154 |
| 6,493,868 B1 * | 12/2002 | DaSilva et al. | 717/105 |
| 6,502,210 B1 * | 12/2002 | Edwards | 714/38 |
| 6,557,119 B1 * | 4/2003 | Edwards et al. | 714/38 |
| 6,584,436 B2 * | 6/2003 | Hellestrand et al. | 703/13 |
| 6,611,276 B1 | 8/2003 | Muratori et al. | 345/772 |
| 6,728,949 B1 * | 4/2004 | Bryant et al. | 717/127 |
| 6,804,814 B1 * | 10/2004 | Ayers et al. | 717/135 |
| 6,848,097 B1 * | 1/2005 | Alverson et al. | 717/124 |
| 6,871,298 B1 * | 3/2005 | Cavanaugh et al. | 714/33 |
| 6,973,417 B1 * | 12/2005 | Maxwell et al. | 703/2 |
| 7,028,291 B2 * | 4/2006 | Sumida et al. | 717/128 |
| 7,055,136 B2 * | 5/2006 | Dzoba et al. | 717/125 |
| 7,080,289 B2 * | 7/2006 | Swaine et al. | 714/45 |
| 7,080,365 B2 * | 7/2006 | Broughton et al. | 717/146 |
| 7,093,236 B2 * | 8/2006 | Swaine et al. | 717/128 |
| 7,133,820 B2 * | 11/2006 | Pennello et al. | 703/22 |
| 7,134,116 B1 * | 11/2006 | Thekkath et al. | 717/128 |
| 2002/0144235 A1 * | 10/2002 | Simmers et al. | 717/124 |
| 2002/0199173 A1 * | 12/2002 | Bowen | 717/129 |
| 2003/0088854 A1 * | 5/2003 | Wygodny et al. | 717/130 |
| 2003/0110476 A1 * | 6/2003 | Aihara | 717/135 |
| 2003/0135718 A1 * | 7/2003 | DeWitt et al. | 712/227 |
| 2003/0192034 A1 * | 10/2003 | Hayase | 717/128 |
| 2004/0088691 A1 * | 5/2004 | Hammes et al. | 717/158 |
| 2004/0162717 A1 * | 8/2004 | Nouri et al. | 703/17 |
| 2004/0255099 A1 * | 12/2004 | Kromer | 712/219 |

OTHER PUBLICATIONS

Ferrante et al., "The Program Dependence Graph and Its Use in Optimization," 1987, ACM, p. 319-349.*

Loh, Gabriel, "A Time-Stamping Algorithm for Efficient Performance Estimation of Superscalar Processors," 2001, ACM, p. 72-81.*

* cited by examiner

INSTRUCTION OPERAND TRACING FOR SOFTWARE DEBUG

BACKGROUND

Many processor chip vendors provide hardware simulators so that software developers can begin debugging the software prior to running the software on the processor hardware. The simulator enables a user to obtain detailed information during the execution of the software.

Some software debugger systems allow a user to step through a simulation one instruction at a time, displaying each instruction as it executes. Selected memory data values may be displayed to the user. A list of executed instructions may be captured as a history as well.

DESCRIPTION OF DRAWINGS

Like reference numerals will be used to represent like elements.

DETAILED DESCRIPTION

Figure 1:
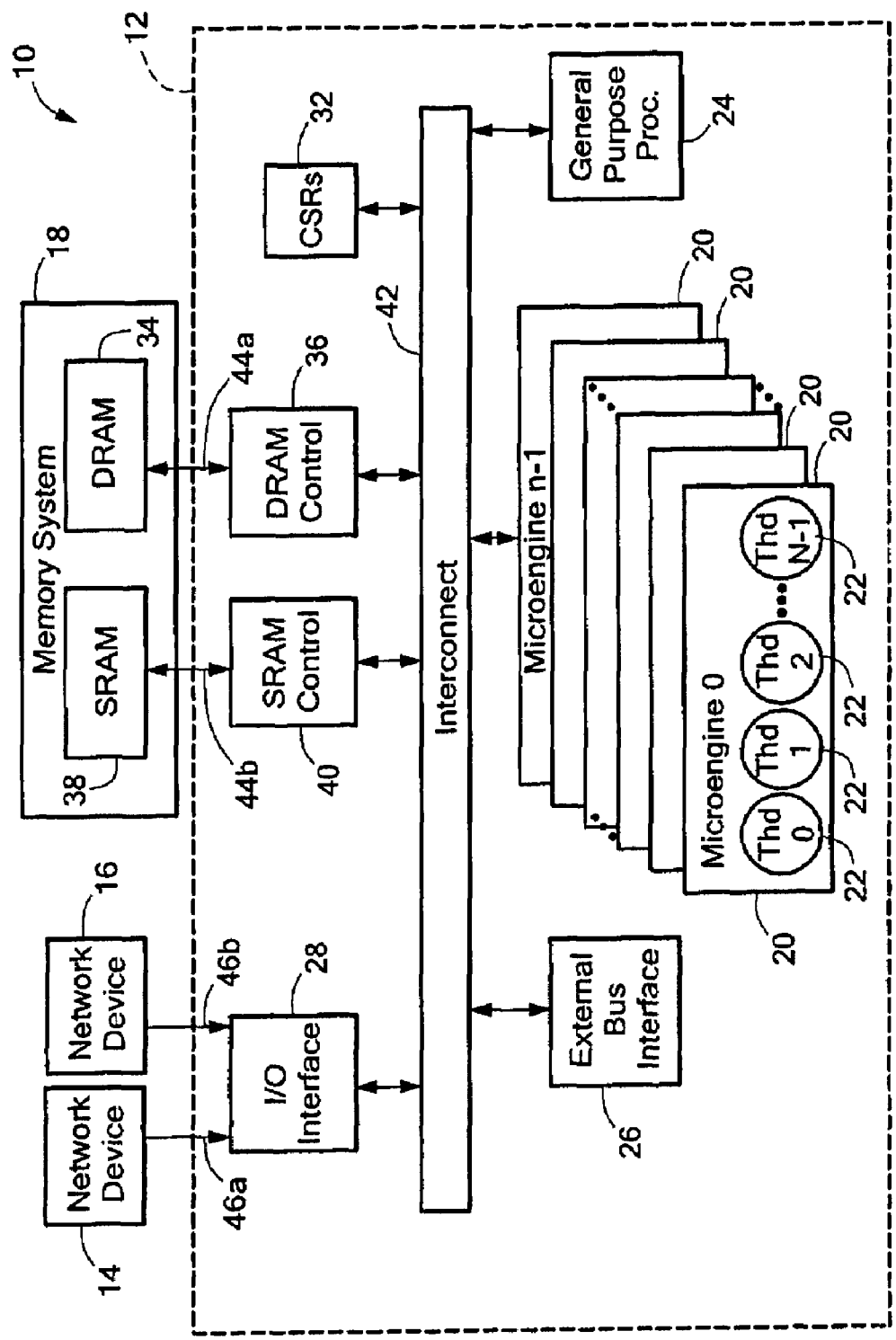
FIG. 1 is a block diagram of a processor having microengines that support multiple threads of execution.

Referring to FIG. 1, a system 10 includes a processor 12 coupled to one or more I/O devices, for example, network devices 14 and 16, as well as a memory system 18. The processor 12 includes multiple processors ("microengines" or "MEs") 20, each with multiple hardware controlled execution threads 22. In the example shown, there are "n" microengines 20, and each of the microengines 20 is capable of processing multiple threads 22, as will be described more fully below. In the described embodiment, the maximum number "N" of threads supported by the hardware is eight. Each of the microengines 20 is connected to and can communicate with adjacent microengines.

In one embodiment, the processor 12 also includes a processor 24 that assists in loading microcode control for the microengines 20 and other resources of the processor 12, and performs other general-purpose computer type functions such as handling protocols and exceptions. In network processing applications, the processor 24 can also provide support for higher layer network processing tasks that cannot be handled by the microengines 20.

The microengines 20 each operate with shared resources including, for example, the memory system 18, an external bus interface 26, an I/O interface 28 and Control and Status Registers (CSRs) 32. The I/O interface 28 is responsible for controlling and interfacing the processor 12 to the I/O devices 14, 16. The memory system 18 includes a Dynamic Random Access Memory (DRAM) 34, which is accessed using a DRAM controller 36 and a Static Random Access Memory (SRAM) 38, which is accessed using an SRAM controller 40. Although not shown, the processor 12 also would include a nonvolatile memory to support boot operations. The DRAM 34 and DRAM controller 36 are typically used for processing large volumes of data, e.g., in network applications, processing of payloads from network packets. In a networking implementation, the SRAM 38 and SRAM controller 40 are used for low latency, fast access tasks, e.g., accessing look-up tables, storing buffer descriptors and free buffer lists, and so forth.

The devices 14, 16 can be any network devices capable of transmitting and/or receiving network traffic data, such as framing/MAC devices, e.g., for connecting to 10/100BaseT Ethernet, Gigabit Ethernet, ATM or other types of networks, or devices for connecting to a switch fabric. For example, in one arrangement, such a network forwarding device line card, the network device 14 could be an Ethernet MAC device (connected to an Ethernet network, not shown) that transmits data to the processor 12 and device 16 could be a switch fabric device that receives processed data from processor 12 for transmission onto a switch fabric.

In addition, each network device 14, 16 can include a plurality of ports to be serviced by the processor 12. The I/O interface 28 therefore supports one or more types of interfaces, such as an interface for packet and cell transfer between a PHY device and a higher protocol layer (e.g., link layer), or an interface between a traffic manager and a switch fabric for Asynchronous Transfer Mode (ATM), Internet Protocol (IP), Ethernet, and similar data communications applications. The I/O interface 28 may include separate receive and transmit blocks, and each may be separately configurable for a particular interface supported by the processor 12.

Other devices, such as a host computer and/or bus peripherals (not shown), which may be coupled to an external bus controlled by the external bus interface 26 can also serviced by the processor 12.

In general, as a network processor, the processor 12 can interface to any type of communication device or interface that receives/sends data. The processor 12 functioning as a network processor could receive units of information from a network device like network device 14 and process those units in a parallel manner. The unit of information could include an entire network packet (e.g., Ethernet packet) or a portion of such a packet, e.g., a cell such as a Common Switch Interface (or "CSIX") cell or ATM cell, or packet segment. Other units are contemplated as well.

Each of the functional units of the processor 12 is coupled to an internal bus structure or interconnect 42. Memory busses 44a, 44b couple the memory controllers 36 and 40, respectively, to respective memory units DRAM 34 and SRAM 38 of the memory system 18. The I/O Interface 28 is coupled to the devices 14 and 16 via separate I/O bus lines 46a and 46b, respectively.

Figure 2:
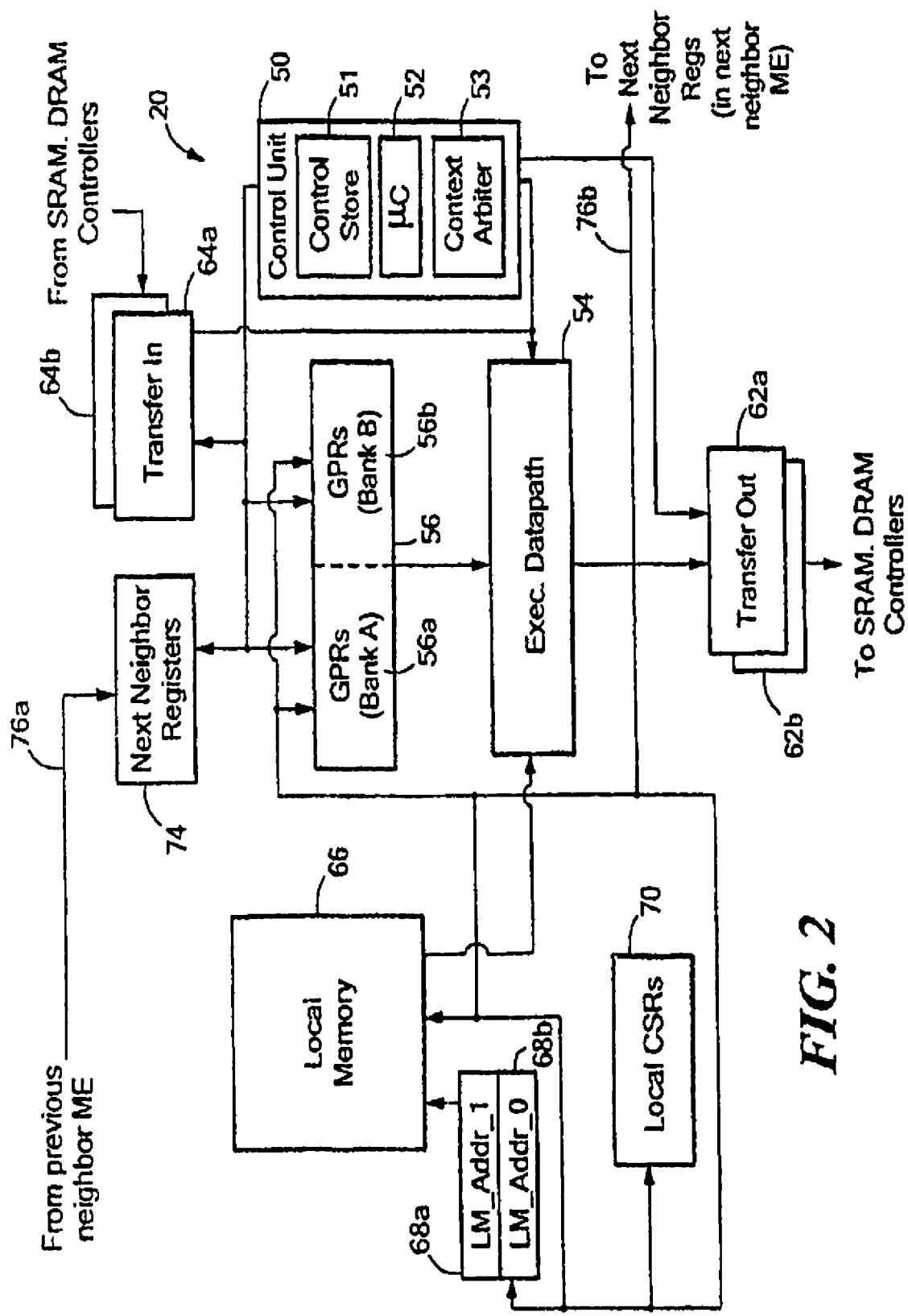
FIG. 2 is a block diagram of a microengine (ME).

Referring to FIG. 2, an exemplary one of the microengines 20 is shown. The microengine (ME) 20 includes a control unit 50 that includes a control store 51, control logic (or microcontroller) 52 and a context arbiter/event logic 53. The control store 51 is used to store microcode. The microcode is loadable by the processor 24. The functionality of the ME threads 22 is therefore determined by the microcode loaded via the core processor 24 for a particular user's application into the microengine's control store 51.

The microcontroller 52 includes an instruction decoder and program counter (PC) units for each of the supported threads. The context arbiter/event logic 53 can receive messages from any of the shared resources, e.g., SRAM 38, DRAM 34, or processor core 24, and so forth. These messages provide information on whether a requested function has been completed.

The ME 20 also includes an execution datapath 54 and a general purpose register (GPR) file unit 56 that is coupled to the control unit 50. The datapath 54 may include a number of different datapath elements, e.g., an ALU, a multiplier and a Content Addressable Memory (CAM).

The registers of the GPR file unit 56 (GPRs) are provided in two separate banks, bank A 56a and bank B 56b. The GPRs are read and written exclusively under program control. The GPRS, when used as a source in an instruction, supply operands to the datapath 54. When used as a destination in an instruction, they are written with the result of the datapath 54. The instruction specifies the register number of the specific GPRs that are selected for a source or destination. Opcode bits in the instruction provided by the control unit 50 select which datapath element is to perform the operation defined by the instruction.

The ME 20 further includes write transfer (transfer out) register file 62 and a read transfer (transfer in) register file 64. The write transfer registers of the write transfer register file 62 store data to be written to a resource external to the microengine. In the illustrated embodiment, the write transfer register file is partitioned into separate register files for SRAM (SRAM write transfer registers 62a) and DRAM (DRAM write transfer registers 62b). The read transfer register file 64 is used for storing return data from a resource external to the microengine 20. Like the write transfer register file, the read transfer register file is divided into separate register files for SRAM and DRAM, register files 64a and 64b, respectively. The transfer register files 62, 64 are connected to the datapath 54, as well as the control store 50. It should be noted that the architecture of the processor 12 supports "reflector" instructions that allow any ME to access the transfer registers of any other ME.

Also included in the ME 20 is a local memory 66. The local memory 66 is addressed by registers 68a ("LM_Addr_1"), 68b ("LM_Addr_0"), which supplies operands to the datapath 54, and receives results from the datapath 54 as a destination.

The ME 20 also includes local control and status registers (CSRs) 70, coupled to the transfer registers, for storing local inter-thread and global event signaling information, as well as other control and status information. Other storage and functions units, for example, a Cyclic Redundancy Check (CRC) unit (not shown), may be included in the microengine as well.

Other register types of the ME 20 include next neighbor (NN) registers 74, coupled to the control store 50 and the execution datapath 54, for storing information received from a previous neighbor ME ("upstream ME") in pipeline processing over a next neighbor input signal 76a, or from the same ME, as controlled by information in the local CSRs 70. A next neighbor output signal 76b to a next neighbor ME ("downstream ME") in a processing pipeline can be provided under the control of the local CSRs 70. Thus, a thread on any ME can signal a thread on the next ME via the next neighbor signaling.

Figure 3:
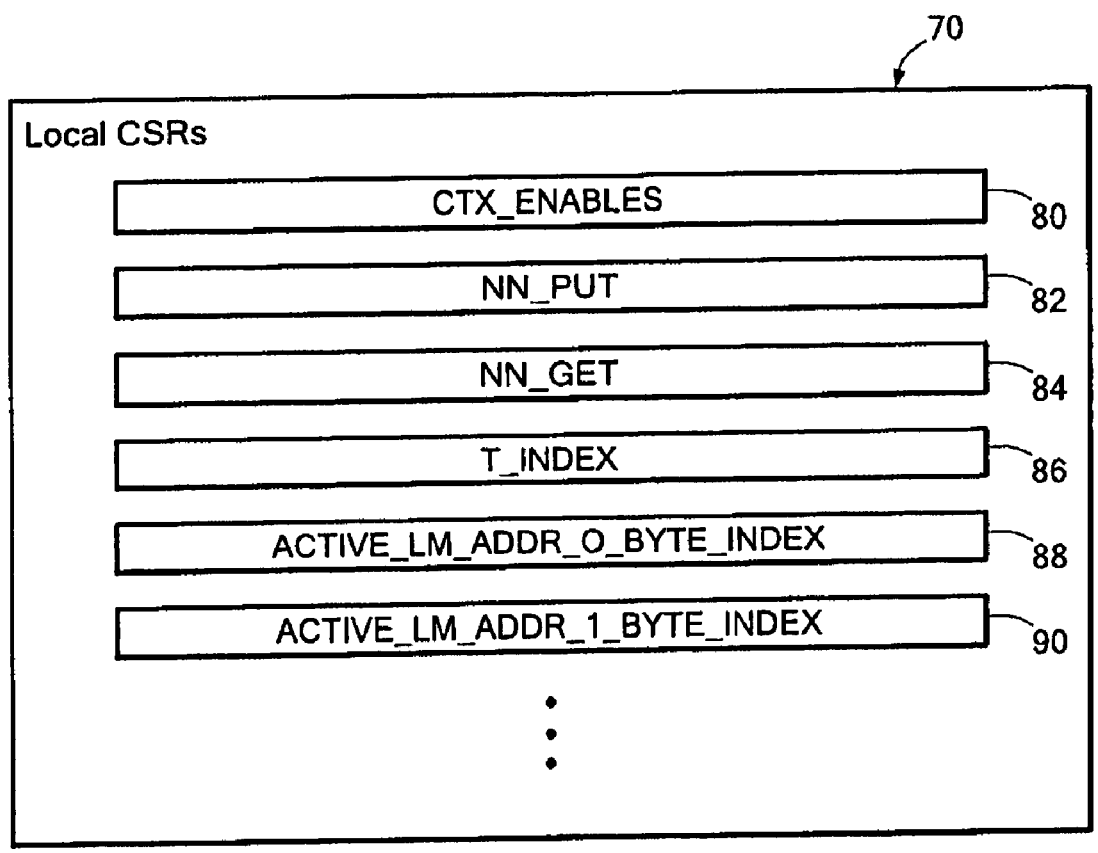
FIG. 3 is a depiction of some local Control and Status Registers (CSRs) of the ME (from FIG. 2).

Generally, the local CSRs 70 are used to maintain context state information and inter-thread signaling information. Referring to FIG. 3, registers in the local CSRs 70 may include the following: CTX_ENABLES 80; NN_PUT 82; NN_GET 84; T_INDEX 86; ACTIVE_LM ADDR_0_BYTE_INDEX 88; and ACTIVE_LM ADDR_1_BYTE_INDEX 90. The CTX_ENABLES register 80 specifies, among other information, the number of contexts in use (which determines GPR and transfer register allocation) and which contexts are enabled. It also controls how NN mode, that is, how the NN registers in the ME are written (NN_MODE='0' meaning that the NN registers are written by a previous neighbor ME, NN_MODE='1' meaning the NN registers are written from the current ME to itself). The NN_PUT register 82 contains the "put" pointer used to specify the register number of the NN register that is written using indexing. The NN_GET register 84 contains the "get" pointer used to specify the register number of the NN register that is read when using indexing. The T_INDEX register 86 provides a pointer to the register number of the transfer register (that is, the S_TRANSFER register 62a or D_TRANSFER register 62b) that is accessed via indexed mode, which is specified in the source and destination fields of the instruction. The ACTIVE_LM ADDR_0_BYTE_INDEX 88 and ACTIVE_LM ADDR_1_BYTE_INDEX 90 provide pointers to the number of the location in local memory that is read or written. Reading and writing the ACTIVE_LM_ADDR_x_BYTE_INDEX register reads and writes both the corresponding LM_ADDR_x register and BYTE INDEX registers (also in the local CSRs).

In the illustrated embodiment, the GPR, transfer and NN registers are provided in banks of 128 registers. The hardware allocates an equal portion of the total register set to each ME thread. The 256 GPRs per-ME can be accessed in thread-local (relative) or absolute mode. In relative mode, each thread accesss a unique set of GPRs (e.g., a set of 16 registers in each bank if the ME is configured for 8 threads). In absolute mode, a GPR is accessible by any thread on the ME. The mode that is used is determined at compile (or assembly) time by the programmer. The transfer registers, like the GPRS, can be assessed in relative mode or in absolute-mode. If accessed globally in absolute mode, they are accessd indirectly through an index register, the T_INDEX register. The T_INDEX is loaded with the transfer register number to access.

As discussed earlier, the NN registers can be used in one or two modes, the "neighbor" and "self" modes (configured using the NN_MODE bit in the CTX_ENABLES CSR). The "neighbor" mode makes data written to the NN registers available in the NN registers of a next (adjacent) downstream ME. In the "self" mode, the NN registers are used as extra GPRs. That is, data written into the NN registers is read back by the same ME. The NN_GET and NN_PUT registers allow the code to treat the NN registers as a queue when they are configured in the "neighbor" mode. The NN_GET and NN_PUT CSRs can be used as the consumer and producer indexes or pointers into the array of NN registers.

At any give time, each of the threads (or contexts) of a given ME is in one of four states: inactive; executing; ready and sleep. At most one thread can be in the executing state at a time. A thread on a multi-threaded processor such as ME 20 can issue an instruction and then swap out, allowing another thread within the same ME to run. While one thread is waiting for data, or some operation to complete, another thread is allowed to run and complete useful work. When the instruction is complete, the thread that issued it is signaled, which causes that thread to be put in the ready state when it receives the signal. Context switching occurs only when an executing thread explicitly gives up control. The thread that has transitioned to the sleep state after executing and is waiting for a signal is, for all practical purposes, temporarily disabled (for arbitration) until the signal is received.

Figure 4:
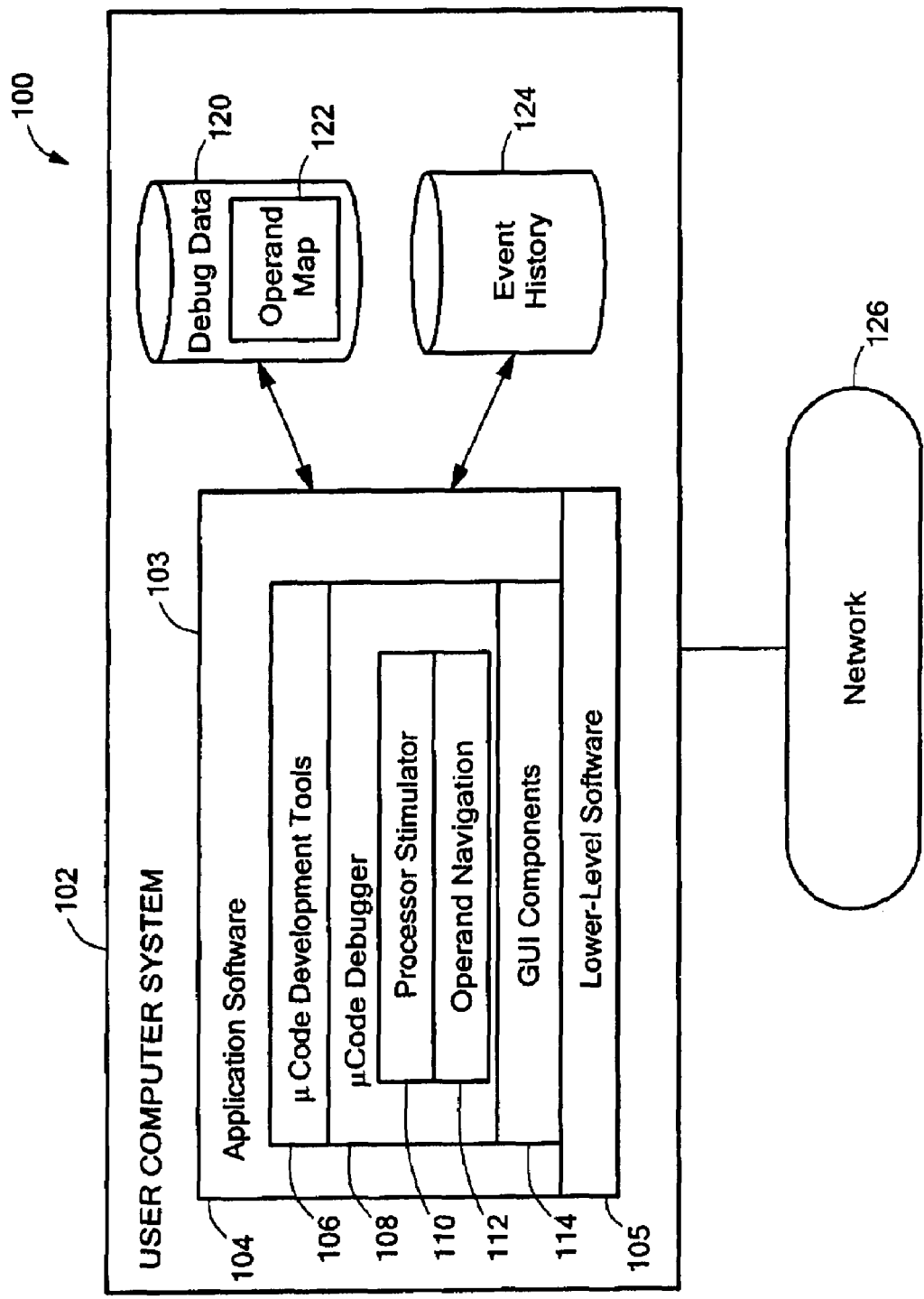
FIG. 4 is an exemplary environment in which a development/debugging system is usable to debug microcode to be executed by the threads of the ME shown in FIG. 2.

FIG. 4 shows an integrated development/debugger system environment 100 that includes a user computer system 102. The computer system 102 is configured to debug microcode that is intended to execute on a processing element. In one embodiment, to be described, the processing element is the ME 20, which may operate in conjunction with other MEs 20, as shown in FIGS. 1-2. Software 103 includes both upper-level application software 104 and lower-level software (such as an operating system or "OS") 105. The application software 104 includes microcode development tools 106 (for example, in the example of processor 12, a compiler and/or assembler, and a linker, which takes the compiler or assembler output on a per-ME basis and generates an image file for all specified MEs). The application software 104 further includes a source level microcode debugger 108, which include a processor simulator 110 (to simulate the hardware features of processor 12) and an Operand Navigation mechanism 112. Also include in the application software 104 are GUI components 114, some of which support the Operand Navigation mechanism 112. The Operand Navigation 112 can be used to trace instructions, and more particularly, instruction operands, during debug, as will be described.

Still referring to FIG. 4, the system 102 also includes several databases. The databases include debug data 120, which is "static" (as it is produced by the compiler/linker or assembler/linker at build time) and includes an Operand Map 122, and an event history 124. The event history stores historical information (such as register values at different cycle times) that is generated over time during simulation. The system 102 may be operated in standalone mode or may be coupled to a network 126 (as shown).

Figure 5:
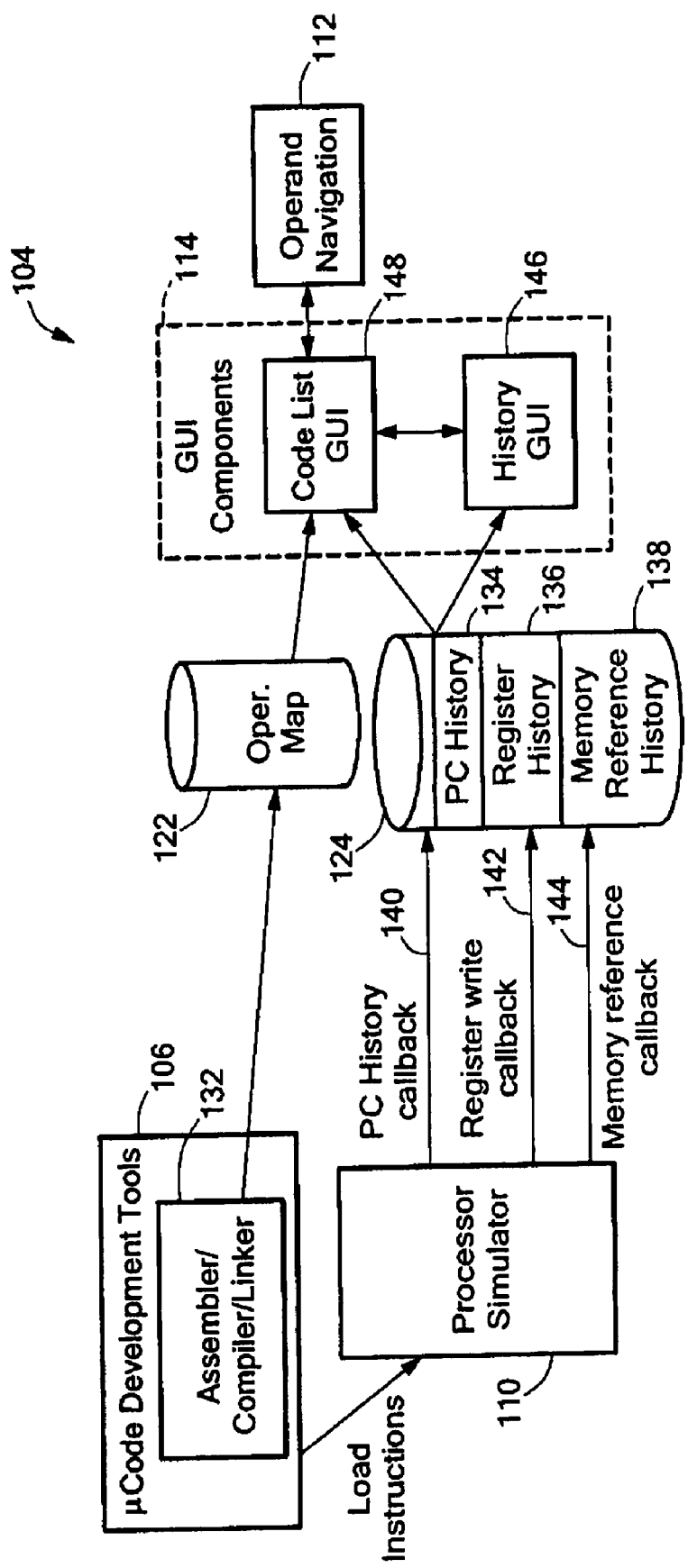
FIG. 5 is a block diagram illustrating the various components of the development/debugger system (from FIG. 4) needed to perform an "Operand Navigation".

FIG. 5 shows a more detailed view of the various components of the application software 104, in particular those components that are needed to perform an instruction operand trace. They include an assembler and/or compiler, as well as linker 132; the processor simulator 110; the Event History 124; the (Instruction) Operation Map 122; GUI components 114; and the Operand Navigation process 112. The Event History 124 includes a Thread (Context)/PC History 134, a Register History 136 and a Memory Reference History 138. These histories, as well as the Operand Map 122, exist for every ME 20 in the processor 12.

The assembler and/or compiler produces the Operand Map 122 and, along with a linker, provides the microcode instructions to the processor simulator 110 for simulation. During simulation, the processor simulator 110 provides event notifications in the form of callbacks to the Event History 124. The callbacks include a PC History callback 140, a register write callback 142 and a memory reference callback 144. In response to the callbacks, that is, for each time event, the processor simulator can be queried for ME state information updates to be added to the Event History. The ME state information includes register and memory values, as well as PC values. Other information may be included as well.

Collectively, the databases of the Event History 124 and the Operand Map 122 provide enough information for the Operand Navigation 112 to follow register source-destination dependencies backward and forward through the ME microcode.

A user uses the GUI components, in particular History GUI 146 and a Code List GUI 148, to interact with the Operand Navigation software. In turn, both of these GUIs use the Event History 124, and the Code List GUI 148 uses the Operand Map. The Code List GUI 148 includes specific GUI support for the Operand Navigation, as is shown in FIG. 6.

Figure 6:
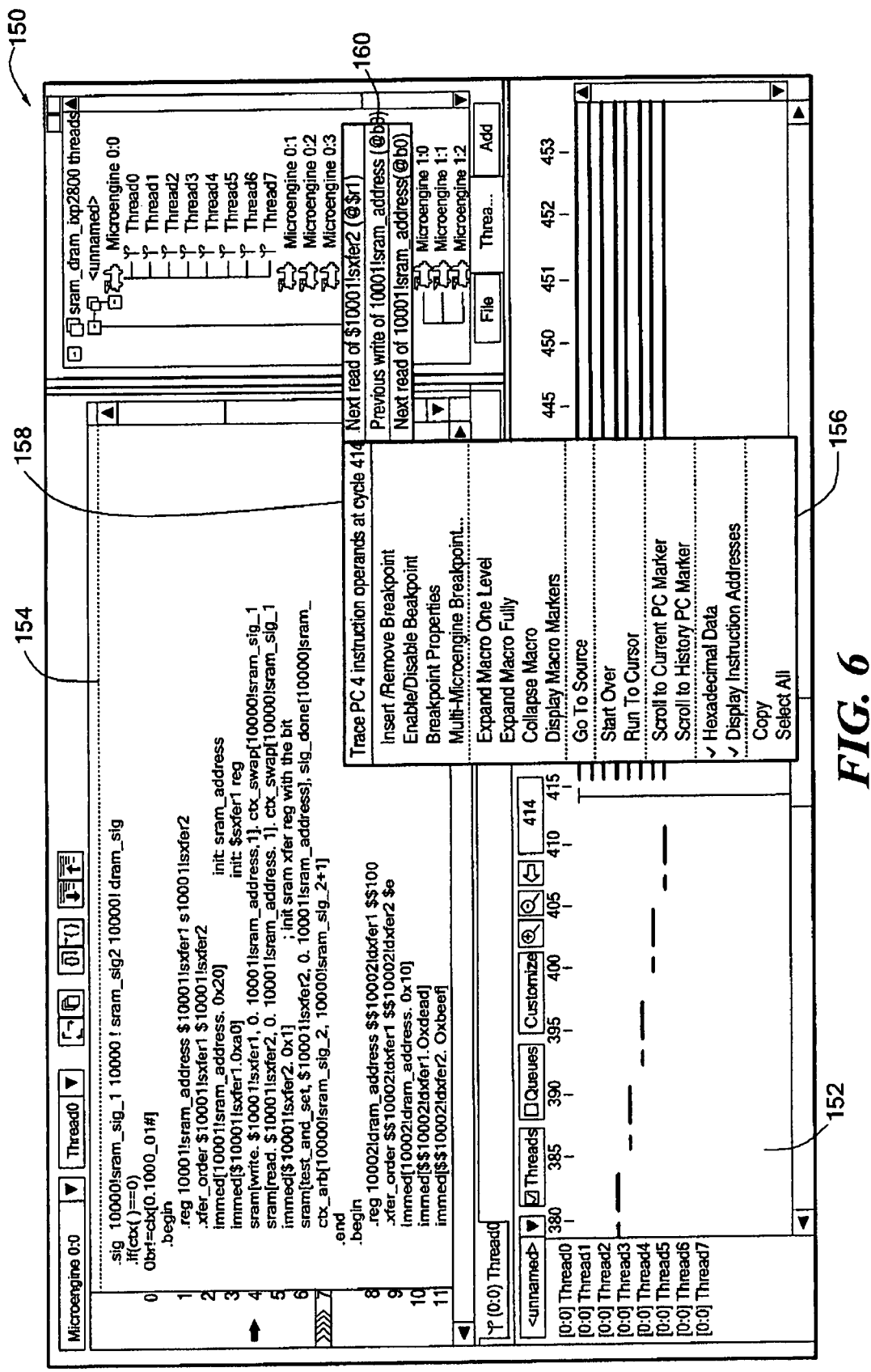
FIG. 6 is a screen shot presented by a graphical user interface (GUI) of the Operand Navigation.

Referring to FIG. 6, an exemplary screen shot 150 showing various views including a Thread History 152 (of the History GUI 146) and a Thread Window (or Code List View) 154 (of the Code List GUI 148). While running a software application on the processor simulator 110, a history of register and memory values is saved. Using these values, the GUI components 146 and 148 present the Threads History 152 where the user can step backward and forward in the history by a sliding cycle time window. The user can stop at any given cycle time of the simulation, and switch over to the Code List View 154. In the Code List View 154, the code line that executed at the given cycle time is marked as the "instruction of interest". The user can right-click on the Code List View and be provided with a pop-up menu 156 that includes as a menu item an Operand Navigation option 158. Selecting that menu item or option generates a submenu 160, which gives options to jump backward or forward in simulation execution time, backward in time to the code line where a source variable was set, or forward in time to code lines that used a result variable.

If the user has stopped the simulation or if a breakpoint has been reached, the Thread Window 154 marks the next instruction to be executed. If the user has already stepped back through ME instruction execution history to a previous cycle, then the Thread Window 154 marks the instruction that is about to be executed at that cycle. In either case, the marked instruction is considered the "instruction of interest" and the simulation cycle for the marked instruction is considered the "cycle of interest". When the user's cursor hovers over an operand in the "instruction of interest" line in the Thread Window, the variable value is shown for the given cycle in the PC History. As mentioned earlier, when the user right-clicks the mouse, the pop-up menu appears, enabling the user to go backward to the cycle and to the instruction when this operand was most recently written, or go forward to the cycle and instruction that next uses this operand.

Figure 7:
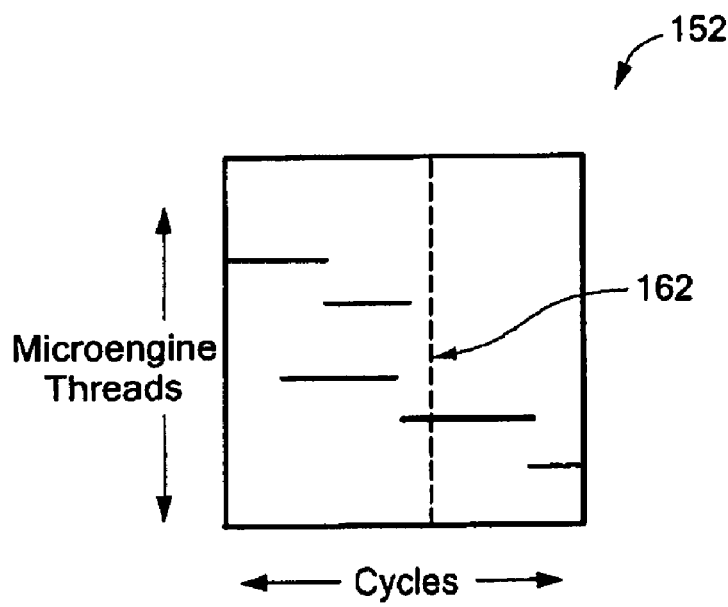
FIG. 7 is a depiction of a GUI thread history.
Figure 8:
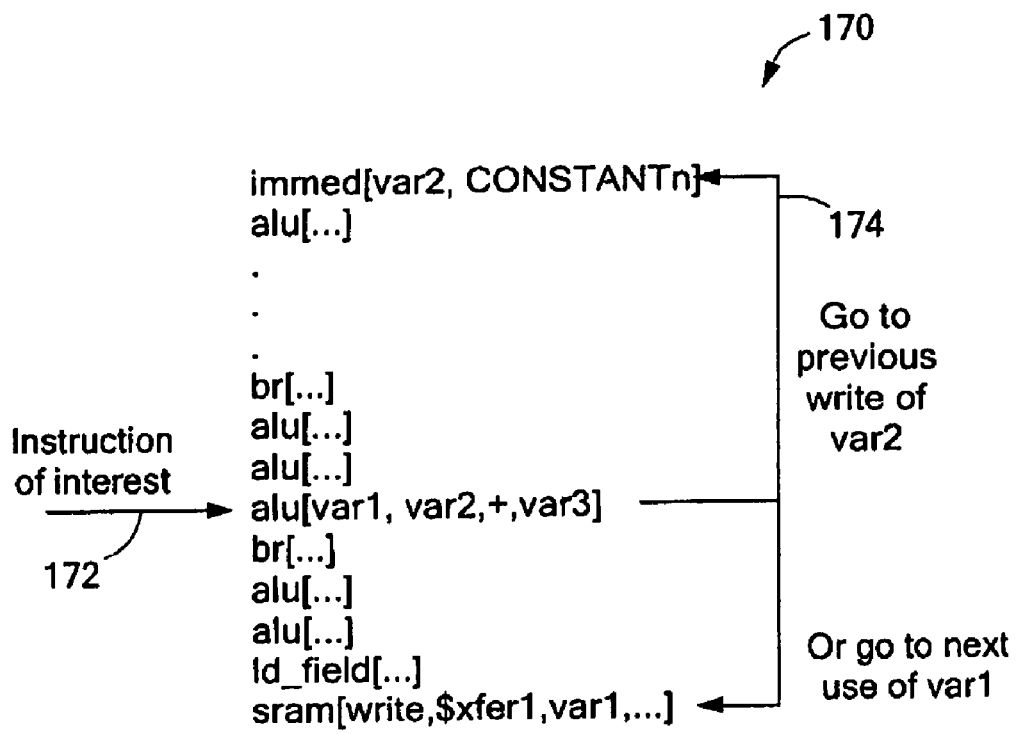
FIG. 8 is a depiction of a GUI thread window (or code list view).

Referring to FIG. 7, a depiction of the Thread History 152 shows the selection of a thread and cycle 162 by a user. Referring now to FIG. 8, a partial code list 170 (that would be displayed in the Code List View 154 for a cycle selection such as that depicted in FIG. 7) is shown. For a an instruction of interest 172 and particular source instruction variable 'var2', the Operand Navigation mechanism allows the user to be taken backwards in time to the previous write of 'var2' or for the particular result (destination) variable 'var1', forward in time to the next use of 'var1', as indicated by the arrows 174.

Thus, the Operand Navigation mechanism is a code navigation feature available to the user through the Thread Window 154. It is available while debugging using the processor simulator 110. The Operand Navigation allows the user to rapidly follow register source-destination dependencies backward and forward through the program flow without having to step ME history through every instruction and determine the dependencies by inspection.

In the illustrated embodiment, and referring back to FIG. 2, the Operand Navigation feature is supported for the following ME register types: the GPRs 56; the next neighbor registers 74; the transfer registers 62, 64; registers or memory locations of the Local Memory 66; and those of the local CSRs 70 illustrated in FIG. 3. The types of registers supported by the Operand Navigation feature can vary with the architecture of the ME or other processing element (as well as processor) to be simulated during debug. Simply put, the Operand Navigation (along with the databases that it uses) can be adapted to support any type of register of interest to a user during program debug.

Referring back to FIG. 6, the submenu 160 may include the following possible options:

Go to previous write of source src1RegAddr (src1RegName)
Go to next read of source src1RegAddr (src1RegName)
Go to previous write of source src2RegAddr (src2RegName)
Go to next read of source src2RegAddr (src2RegName)
Go to next read of destination destRegAddr (destRegName)
Go to previous write of write xfer reg xferRegAddr (xferRegName)
Go to next read of read xfer reg xferRegAddr (xferRegName)

The inclusion of specific options in the submenu 160 depends on the instruction type being hovered over (that is, whether the instruction type is I/O or non-I/O) and the number of registers of various types reported in the Operand Map 122 and I/O instruction Reference History 138. There can be zero or one destination register shown and between zero and two source registers shown. The 'Go to next read of destination destRegAddr (destRegName)' option would not be included in the submenu for I/O instructions. The list of options including referenced transfer registers would be provided for the I/O instructions. More specifically, the 'Go to previous write of write xfer reg xferRegAddr (xferRegName)' would be shown for I/O write instructions (iterated an appropriated number of times based on a reference count) and the 'Go to next read of read xfer reg xferRegAddr (xferRegName)' would be shown for I/O read instructions (also iterated a number of times based on a reference count).

If a destination or source operand is not specified (e.g., destination was "—" in an alu instruction) or is not meaningful for the instruction (e.g., immed instruction has no source), then the corresponding option is not shown in the Operand Navigation submenu 160.

The term "reference count" refers to the count specified in the instruction. The term "transfer register count" refers to the number of transfer registers the reference count implies. In the illustrated embodiment, depending on the type of I/O instruction, there could be a 1-to-1 correspondence of reference count to transfer register count (for example, SRAM I/O instructions) or a 1-to-2 correspondence of reference count to transfer register count (for example, DRAM I/O instructions). For I/O instructions with a transfer register count greater than one, multiple transfer register items will be shown in the Operand Navigation submenu 160. The transfer register count is obtained from the Memory Reference History event associated with the I/O instruction, not the Operand Map 122, even though indirect_ref may not have been used to override the instruction reference count. Similarly, the transfer register addresses are obtained from a Reference History event, not the Instruction Operand Map. However, the xferRegName, if specified in the I/O instruction, is used along with Debug Data transfer order information to try and determine a name for each transfer register. The xferRegName value is shown if possible. If the transfer register was established using indirect_ref, then no register name may have been specified in the instruction.

The regAddr values above show the physical registers used by the instruction of interest. They will have values like 'GPR b13', 'GPR @all', 'local_mem[55]' and 'write xfer reg $2', to give but a few examples. If the physical register is owned by another microengine, then the regAddr is qualified by the ME address, as in "Go to next read of n$12 in microengine 1:3".

The regName values that appear between the parentheses above are the register names found in the Instruction Operand Map for the instruction of interest. They will have values such as '10001!abc', '*1$index1[4]', '$10003!xf' and the like.

Figure 9:
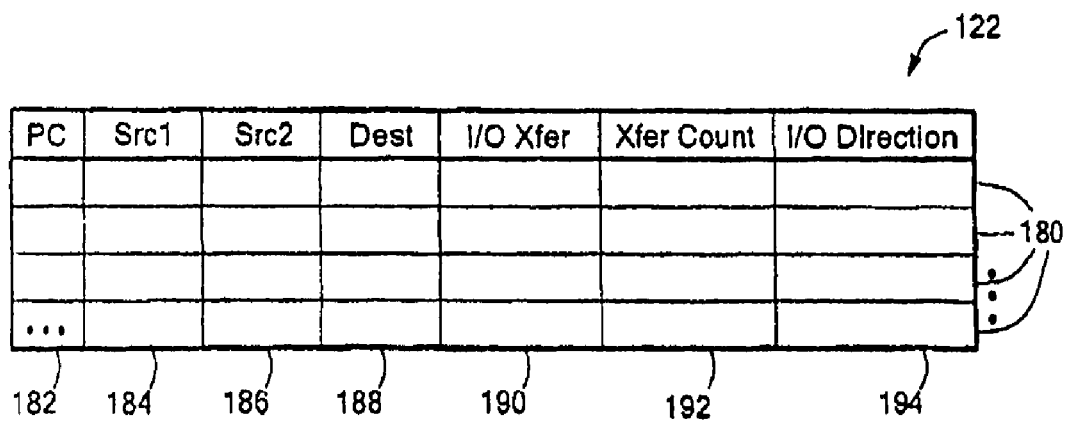
FIG. 9 is a depiction of an exemplary data structure layout of a per-ME Instruction Operand Map.

Referring to FIG. 9, an exemplary data structure layout of the Operands Map 122 is shown. The map is a table placed in the debug data by the linker. For simplicity, only a single table is shown. It will be appreciated that, although only a single table is shown, the Operands Map would actually include such a table (with the same format) for each ME in the processor 12. The table includes a row 180 for each instruction in the ME microcode and lists in column fields the following: PC 182; source operands including source operand SRC1 184 and source operand SRC2 186; destination operand 188; I/O transfer registers 190; I/O transfer ("Xfer") register count 192; and I/O direction (e.g., read, write, or write/read) 194. Thus, the map can be used to do an operands lookup for a given PC.

An ALU instruction can have entries in the PC, Src1, Src2, and Destination columns. An I/O instruction can have entries in all columns except the Destination. The values in the PC column are in the range of 0 through the maximum number of instructions per ME. The values in the I/O transfer register count column are in the range of 0-15. The values in the I/O Direction are "R", "W", or "R/W". The values in the Src1, Src2 and Destination columns are one of:

—Not used by instruction
@A# Absolute GPR A#
@B# Absolute GPR B#
A# Relative GPR A#
B# Relative GPR B#
N$# Relative neighbor register #
$W# Relative Sram Write Xfer register #
$R# Relative Sram Read Xfer register #
$$W# Relative Dram Write Xfer register #
$$R# Relative Dram Read Xfer register #
*S Value in T_INDEX CSR determines Sram reg number
*D Value in T_INDEX CSR determines Sram reg number
*N Value in NN_GET or NN_PUT CSR determines NN reg number
*L0[0-15] Value in ACTIVE_LM_ADDR_0_BYTE_INDEX CSR determines register number
L1[0-15] Value in ACTIVE_LM_ADDR_1_BYTE_INDEX CSR determines register number The values in the I/O Xfer columns are one of:
$W# Relative Sram Write Xfer register #
$R# Relative Sram Read Xfer register #
$$W# Relative Dram Write Xfer register #
$$R# Relative Dram Read Xfer register #

Figure 10:
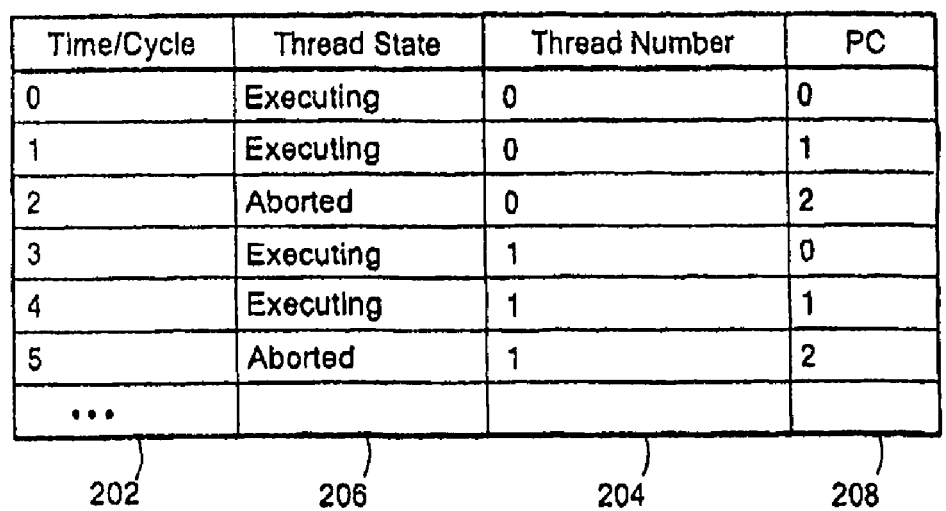
FIG. 10 is a depiction of an exemplary data structure layout of a per-ME Program Counter (PC) History (of the Event History shown in FIGS. 4 and 5).

Referring to FIG. 10, a data structure layout of the PC History 134 is shown. The PC History 134 is a table that stores a threads list for a predetermined number of time/cycles 202. Again, although there would be table for each ME, only a single table is shown. For each time/cycle 202, the PC History 134 stores a thread (context) identified by thread number 204 and associated thread state 206. The PC History also stores a PC value 208 of the PC for that time/cycle. In one embodiment, events that occurred earlier than a user-specified history threshold are removed from the start of the list.

The PC History 134 can be used to determine, for a given time/cycle, the thread number that was executing, if any, and the instruction that the thread executed and the PC value.

The time/cycle 202 increases (without gaps) from earliest history cycle to most recent cycle. The thread state 206 is one of the following: executing, aborted, stalled, idle and disabled. The thread number 204 is any value from 0 through the maximum number of threads per ME. The PC value 208 is any value from 0 through the maximum number of instructions per ME.

Figure 11:
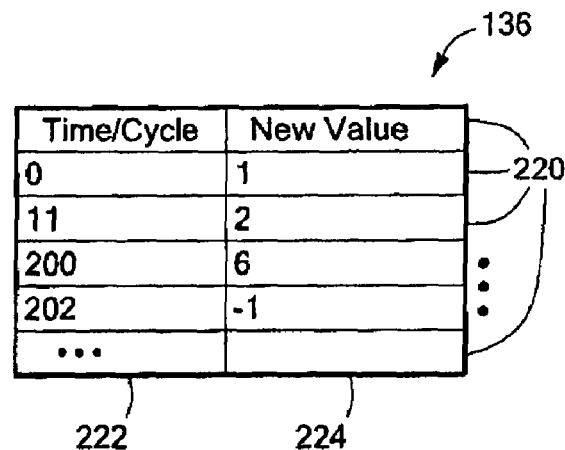
FIG. 11 is a depiction of an exemplary data structure layout of a per-ME, per-register Register History (of the Event History shown in FIGS. 4 and 5).

Referring to FIG. 11, an exemplary data structure layout of the Register History 136 is shown. The data structure may be a simple table as shown. In the illustrated embodiment, there is register history table for each register in an ME, and a set of such register history tables for each ME. The Register History 136 records change events for each register in a ME as a list of time/value pairs 220, each including a time/cycle 222 and corresponding new value 224 (of the register). The list grows over time as register change callbacks from the processor simulator are received. In one embodiment, events that occurred earlier than a user-specified history threshold are removed from the start of the list. Given a time/cycle, it is therefore possible to lookup the value of the register at that time.

In the illustrated embodiment, and again referring back to FIG. 2, history is collected for the following ME registers: the GPRs 56 (including the A bank registers 56a, A0 through A127, and the B bank registers 56b, B0 through B127); the NN Registers 74 (N$0 through N$127); the SRAM Read Xfer Registers 64a ($R0 through $R127); the SRAM Write Xfer Registers ($W0 through $W127) 62a; the DRAM Read Xfer Registers ($$R0 through $$R127) 64b; the DRAM Write Xfer Registers ($$W0 through $$W127) 62b; Local Memory 66 (0 through the maximum number of local memory registers). In addition, history is collected for the following local CSRs: the CTX_ENABLES Register 80; the NN_PUT Register 82; the NN_GET register 84; the T_INDEX 86; the ACTIVE_LM_ADDR_0_BYTE_INDEX Register 88; and the ACTIVE_LM_ADDR_1_BYTE_INDEX Register 90 (all of which were shown in FIG. 3).

Figure 12:
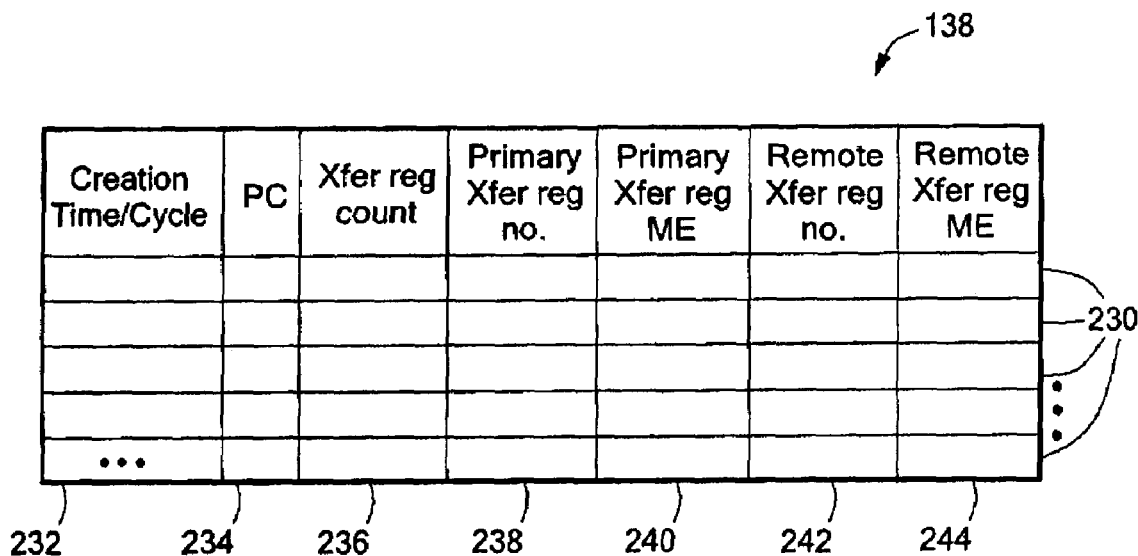
FIG. 12 is a depiction of an exemplary data structure layout of a per-ME Reference History (of the Event History shown in FIGS. 4 and 5).

Turning now to FIG. 12, an exemplary data structure layout of the Memory Reference History 138 is shown. The Reference History 138 may also be implemented as a simple table, as shown. Again, although only one table is shown, there would be a table for each ME. The Reference History 138 records I/O reference events for each thread in a ME as a list ordered by creation time. The list grows over time as I/O instructions execute and callbacks from the simulator are received. Events that occurred earlier than a user-specified history threshold are removed from the start of the list. The History 138 contains a list of events 230, which are described by, among other items: Creation Time/Cycle 232; PC (of the I/O instruction) 234; number of longwords bursted in reference, i.e., the Xfer register count 236; Primary Xfer register number 238; Primary Xfer register ME 240; Remote Xfer register number 242 (meaningful for reflector instructions); and Remote Xfer register ME 244 (also meaningful for reflector instructions). Given values of the Time/Cycle 232 and PC 234, it is possible to look up the actual transfer registers used and their count for any I/O instruction.

The tracing algorithm depends on being able to determine, for any instruction, the physical address of the registers. Once the physical addresses of the appropriate registers are determined, it is a simple matter to traverse forward or backward through Thread/PC History 134 to search for reads or writes of that register. A read or write could have occurred at a particular cycle if the ME was active and the thread state was executing (as opposed to stalled, aborted, or swapped out). When an address match is found, the cycle of interest is modified. This causes all thread windows, data and memory watch windows, and thread history windows to change to reflect the simulation state of the ME(s) at the new cycle of interest. If the matching address is found in a different context than the one where the popup menu was activated, then a Thread Window is activated for that other context.

Figure 13:
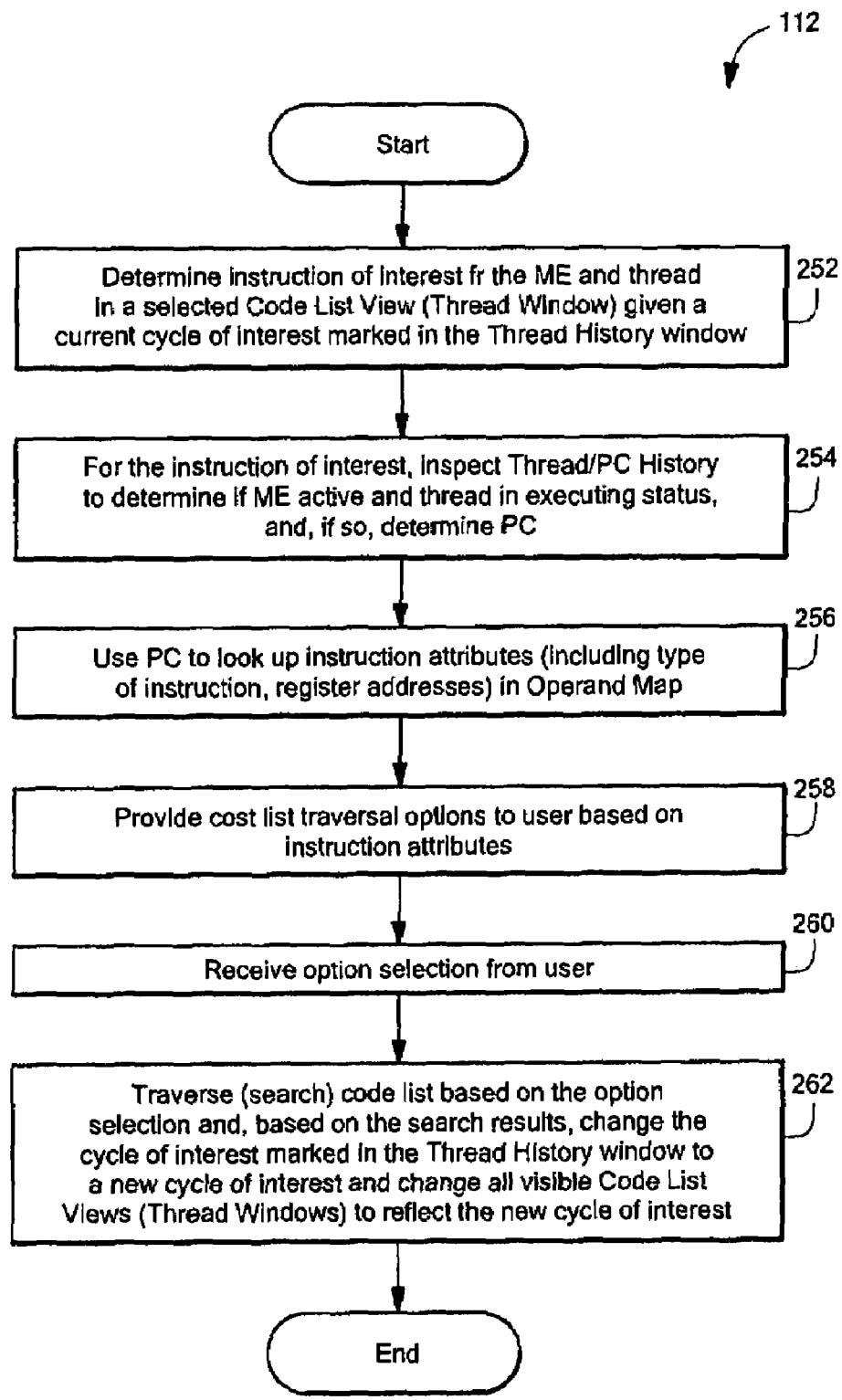
FIG. 13 is a flow diagram depicting the operation of the Operand Navigation in one exemplary embodiment.

Referring to FIG. 13, an overview of the Operand Navigation process 112 is shown. The process 112 begins by determining 252 the instruction of interest for the ME and thread in a selected Code List View (Thread Window) given a current cycle of interest marked in the Thread History window. For that instruction of interest, the process 112 may be prompted to determine 254 if the selected ME was active and the selected thread was in an executing state. The process determines if the ME was active and the thread was executing by inspecting the corresponding Thread/PC history record. (If the thread was not in an executing state, the process may skip the current instruction.) If it is determined that the ME was active, and the thread was in the executing state, then the PC of the active thread (context) is known. The process 112 uses 256 the PC to lookup instruction attributes in the Operand Map. Instruction attributes such as instruction type (I/O or non-I/O), I/O reference count, branch defer count, source and destination register names, source and destination register addresses, transfer register name, and transfer register address, are now known. The process 112 provides 258 to the user code list traversal options based on the instruction attributes. The process 122 receives 260 an option selection from the user. In response, the process 112 traverses (searches) 262 the code list in time based on the user option selection and, based on the search results, modifies the cycle of interest and the instruction of interest indicated to the user in the Thread Window (Code List View). In some cases, as will be described, this last activity may involve activating a Thread Window for a thread on a different ME.

When searching forward in history for the "next read" of a register, the search stops if the register is overwritten before being read. An information dialog may appear to indicate that the register was overwritten before being read. This could occur because the register was not live after its last use as a source operand, or because a different logical register allocated to the same physical register was used before being set.

Figure 14:
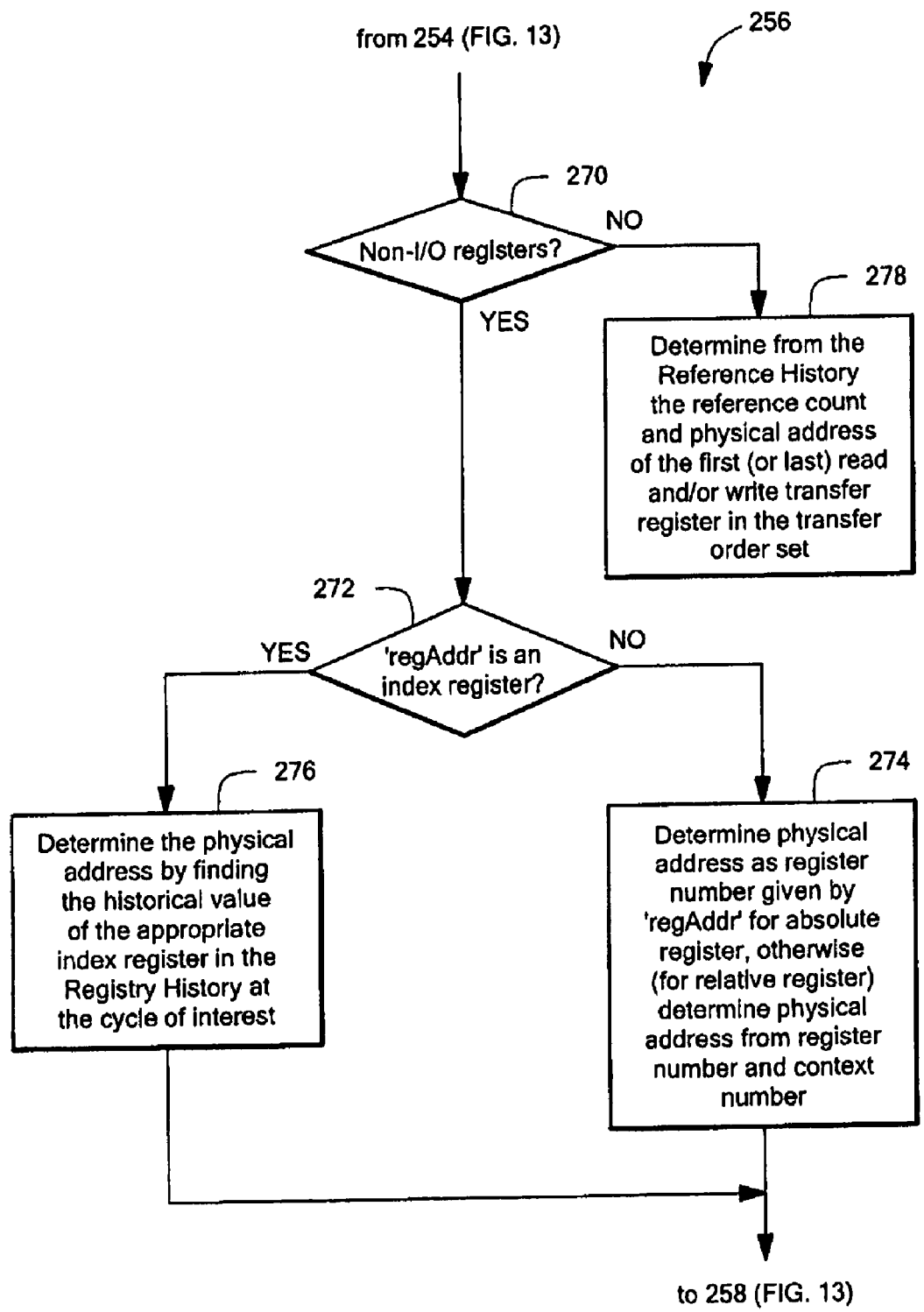
FIG. 14 is a flow diagram of the instruction attributes lookup (from FIG. 13).

Referring to FIG. 14, details of the instruction attributes determination 256 (from FIG. 13) in one exemplary embodiment are shown. For each register in the instruction of interest the process 112 determines 270 if the register is a non-I/O register. If a register is determined to be a non-I/O register, the process 112 further determines 272 if the source or destination regAddr field (fetched from the Operand Map) is an index register. If it is not an index register, then the current register address (e.g. "b5", "@a13" or "$$R15") of that register was established at assembly or compile time and is obtained from the Operand Map. Thus, the process determines 274 the physical address as a register number given by the 'regAddr' in the Operand Map for absolute registers, and for relative registers uses the register number (which is offset based on the context number) and the context number to calculate the physical address. If it is determined (at 272) that the register is an index register, that is, if the source or destination 'regAddr' field fetched from the Operand Map is an index register, then the process determines 276 the physical address that was read from or written to when the instruction executed by looking up the historical value of the appropriate index register in the Register History at the cycle being considered (maybe with a small adjustment to cycle for pipelining). The following table (TABLE 1) shows the index CSRs that correspond to each index register name.

TABLE 1

| Index Register Name | Index CSR |
| --- | --- |
| *1$index0 | ACTIVE_LM_ADDR_0 |
| *1$index1 | ACTIVE_LM_ADDR_1 |
| *$index | T_INDEX |
| *$$index | T_INDEX |
| *n$index | NN_GET or NN_PUT |

The CSRs in TABLE 1 must have register history collected for them in order to support this instruction operand tracing feature. Note that if the local memory is referenced using offset notation (e.g. "1$index1[n]"), then the value of n between 0 and 15 is combined with the value stored in the corresponding index CSR in order to determine the local memory physical address.

Still referring to FIG. 14, if it is determined that the register is an I/O register (that is, read and/or write transfer register actually used by an I/O instruction), the process determines 278 the address of such a register from the Reference History data. The Reference History data contains the reference count and the physical address of the first (or last) read and/or write transfer register in the transfer order set. For some instructions, and especially when indirect_ref was used, the transfer registers could belong to another ME. In that case, the transfer register address shown in the "Operand Navigation" submenu options will be qualified by the ME number, as in "Go to next read of $15 belonging to microengine 0:3".

Figure 15A:
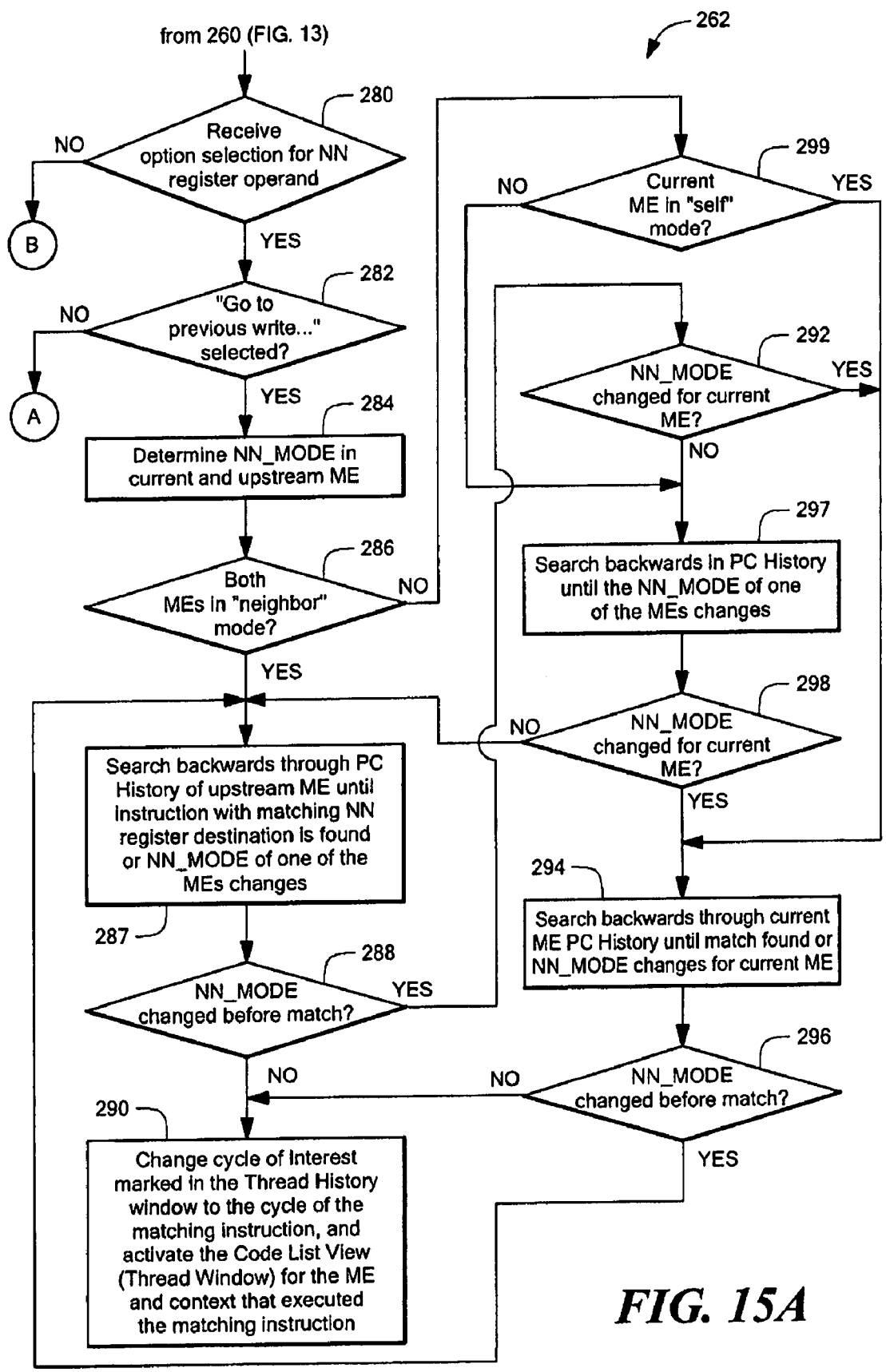
FIGS. 15A-15G are flow diagrams illustrating the code list traversal for selected options (from FIG. 13).
Figure 15B:
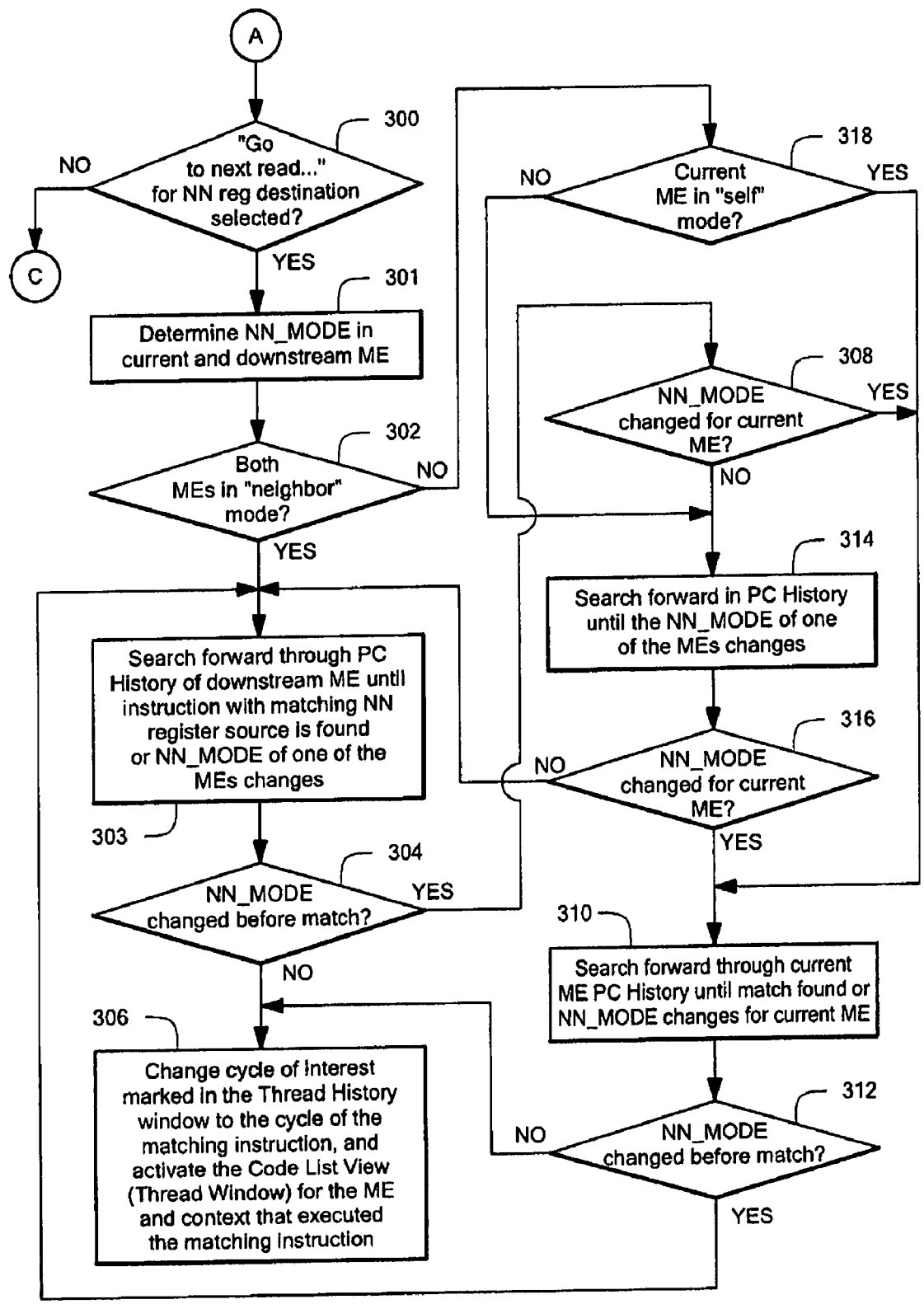
Figures 15C, 15D:
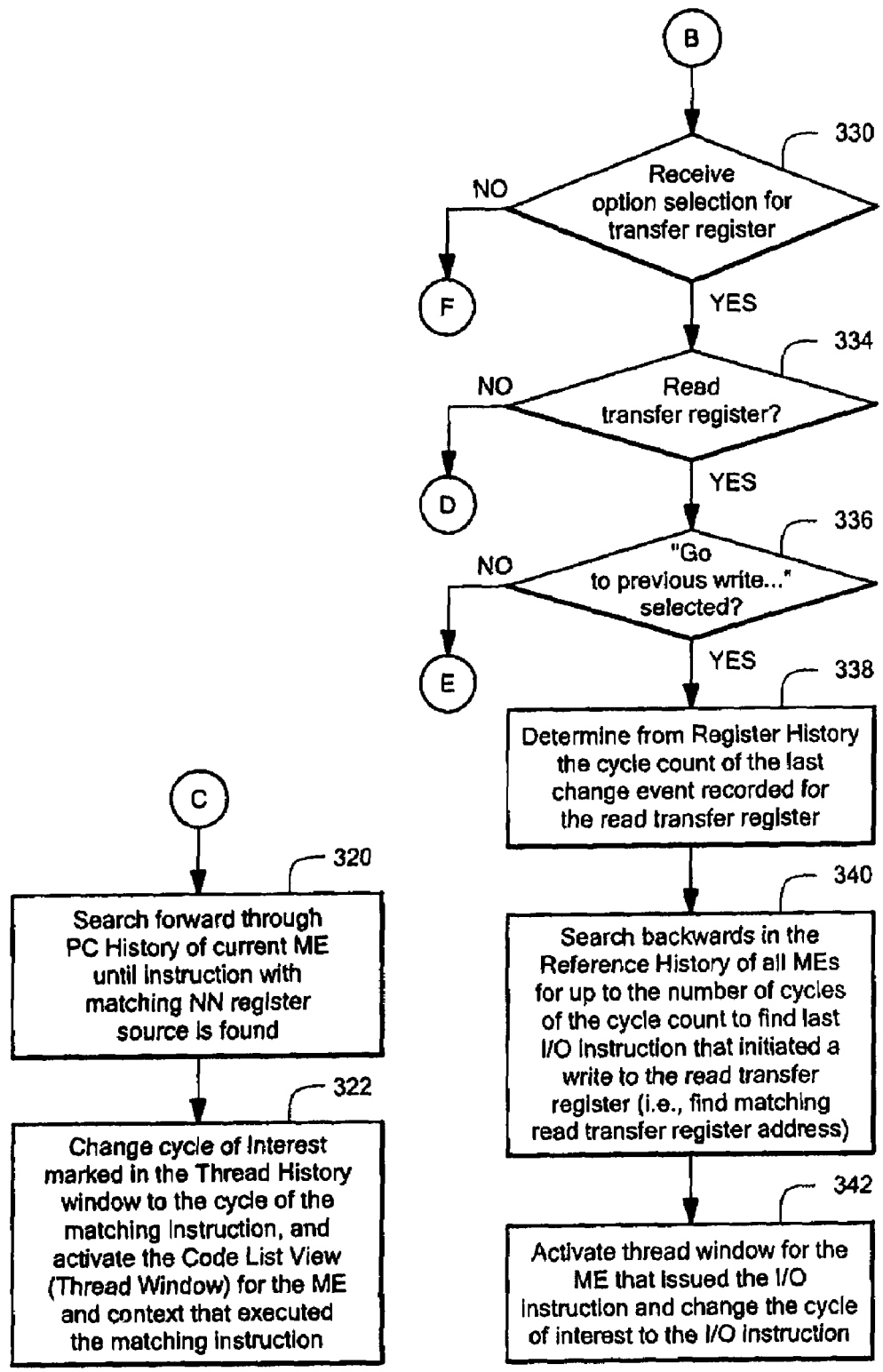
Figure 15E:
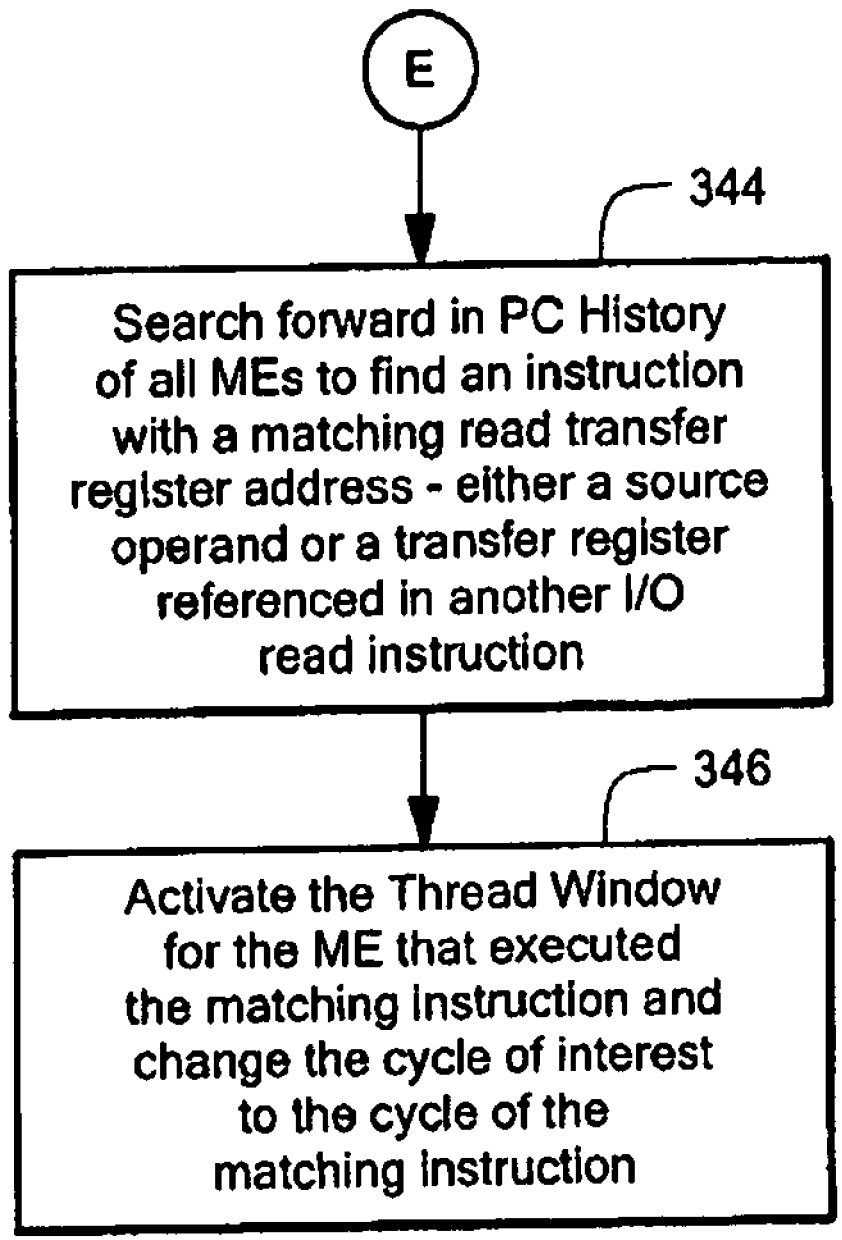
Figure 15F:
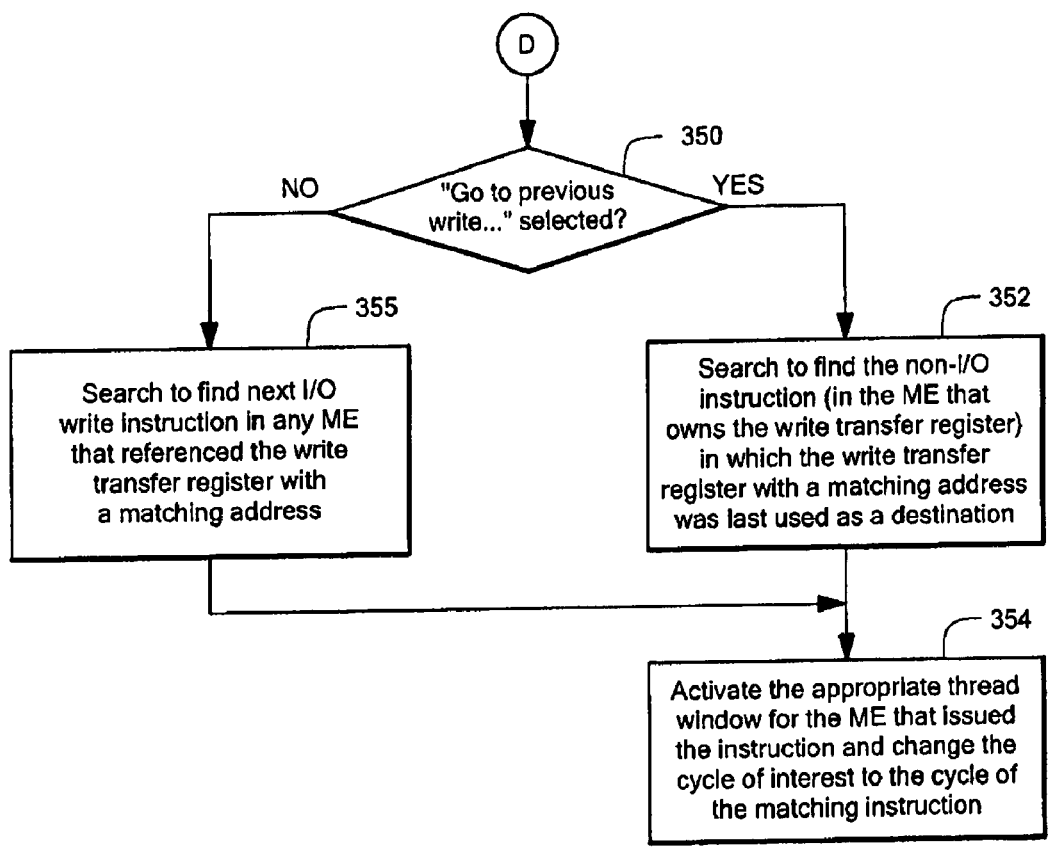
Figure 15G:
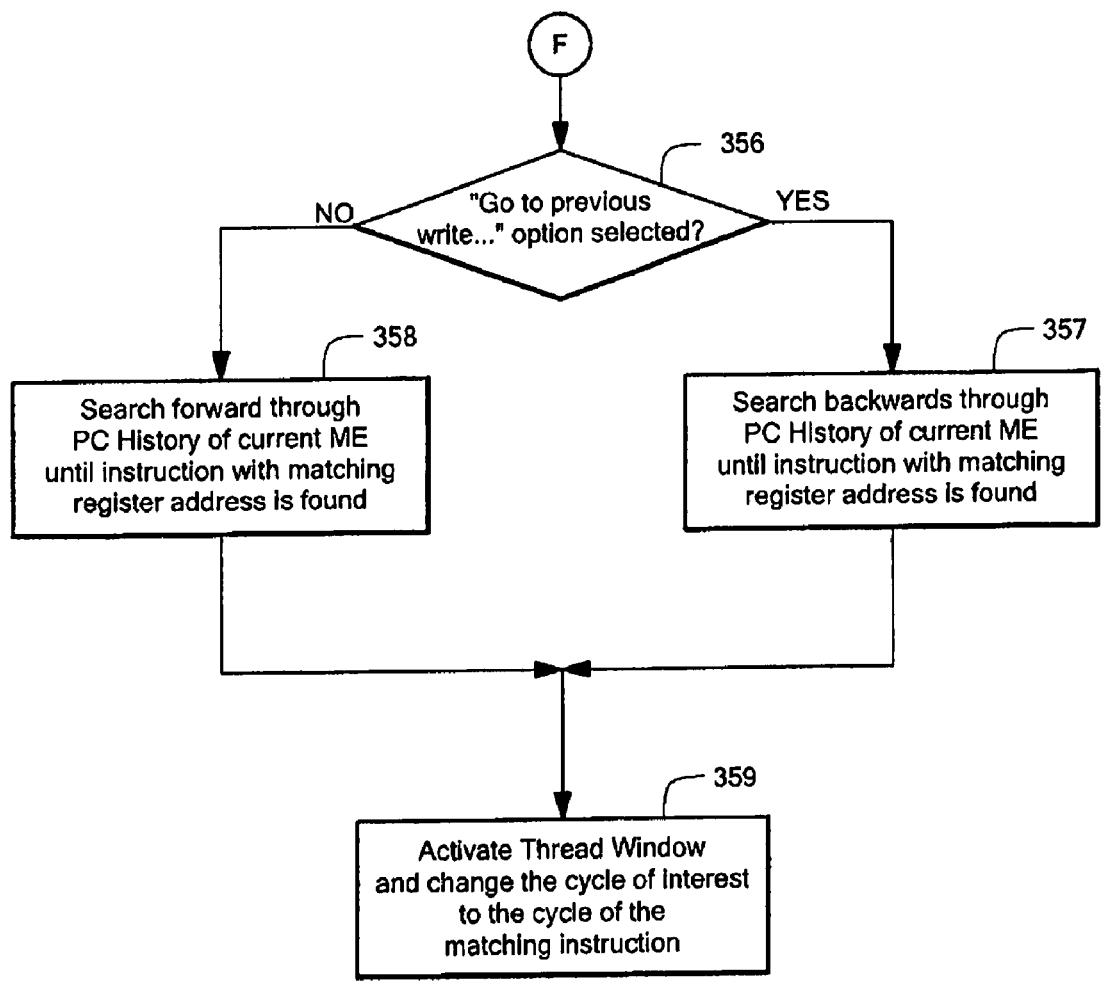

FIGS. 15A-15F show details of the code list search 262 for the selection of various "Operand Navigation" submenu options. FIGS. 15A-15C show search details for searches involving NN registers. FIGS. 15D-15F show search details for searches involving transfer registers. FIG. 15G shows search details for other searches, that is, those not involving NN or transfer registers.

Referring to FIG. 15A, process determines 280 if the received option selection is for an NN register operand. If it is not, some other search appropriate to the register type is performed, as will be described later. Whenever the current ME is operating in "neighbor" mode (i.e., the "NN_MODE" bit is set to '0' in CTX_ENABLES register 80), the instructions that write NN registers affect the downstream ME, not the current one. If the option involves an NN register operand, the process begins by determining 282 if the user selected the "Go to previous write . . . " option or some other option. If the "Go to previous write . . . " option was selected, it is not sufficient to search only the current microengine's Thread/PC History for the last instruction that wrote the NN register. Instead, finding the previous write for an arbitrary NN register may be handled as follows. First, the process checks 284 the state of the NN_MODE in the current and upstream ME. The process determines 286 if both MEs are operating in the "neighbor" mode. If so, the process searches backwards 287 through the upstream microengine Thread/PC History until it finds the instruction with a matching NN register destination (that is, a NN register destination having a physical address that matches that of the NN register in the selected option) or the NN_MODE of one of the microengines changes. It will be appreciated that the PC History search requires that the process step backwards through the instructions, one cycle at a time, using the Operand Map (and possibly Register History) to perform a PC-based lookup of instruction attributes such as instruction/register types and register addresses, as described earlier with reference to FIG. 13, in order to determine a match, and checking the state of the NN_MODE bit as well. If the process determines 288 that the NN_MODE did not change before the NN register destination was matched, the search is complete because a match is found (in this case, in the upstream ME). The process activates 290 the Thread Window for the ME context active at the matching cycle, changes the cycle of interest to the matching cycle and changes the instruction of interest to the matching instruction. Otherwise, at 288, if the NN_MODE changed before the match, the search continues with the process determining (at 292) if the NN_MODE changed for the current ME. If so, the current ME is operating in "self" mode. The process proceeds to search backwards 294 through the current microengine's Thread/PC History until the instruction with a matching NN register destination is found or the NN_MODE of the current ME changes. If, at 296, it is determined that the NN_MODE changed before the NN register destination was matched, the processing returns to 287. Otherwise, the processing returns to 290. If, at 292, it is determined that the NN_MODE changed not for the current ME but the upstream ME, then neither ME could have written the register. For the current ME operating in "neighbor" mode and the upstream ME operating in "self" mode, the process searches backwards 297 through the Thread/PC History until the NN_MODE of one of the MEs changes. The processing then continues by determining (at 298) if the NN_MODE changed for the current ME. If the NN_MODE changed for the current ME (thus changing the NN_MODE for the current ME to "self" mode), the processing returns to 294. If the NN_MODE changed for the upstream ME (changing it to "neighbor" mode so that both MEs are in "neighbor" mode, the processing returns to 287. If, back at 286, it is determined that only one of the MEs is operating in "neighbor" mode, and it is determined (at 299) that the current ME is in "self" mode, the process goes to 294. If, on the other hand, the ME in "self" mode in the upstream ME, the process goes to 297.

If, at 282, it is determined that the selected option was an option other than "Go to previous write . . . ", and turning to FIG. 15B, the process determines 300 if the option was "Go to next read . . . " for a NN register destination. If so, the process checks 301 the state of the NN_MODE in the current and downstream ME. The process determines 302 if both MEs are operating in the "neighbor" mode. If so, the process searches forward 303 through the downstream ME Thread/PC History until it finds the instruction with a matching NN register or the NN_MODE of one of the MEs changes. This PC History search requires that the process step forward through the instructions, one cycle at a time, using the Operand Map (and possibly Register History) to perform a PC-based lookup of instruction attributes such as instruction/register types and register addresses, in order to determine a match, and checking the state of the NN_MODE bit as well. If the process determines 304 that the NN_MODE did not change before the NN register was matched, the search is complete because a match is found (in this case, in the downstream ME). The process activates 306 the Thread Window for the ME context active at the matching cycle, changes the cycle of interest to the matching cycle and changes the instruction of interest to the matching instruction. Otherwise, at 304, if the NN_MODE changed before the match, the search continues with the process determining (at 308) if the NN_MODE changed for the current ME. If so, the current ME is operating in "self" mode. The process thus proceeds to search forward 310 through the current microengine's Thread/PC History until the instruction with a matching NN register is found or the NN_MODE of the current ME changes. If, at 312, it is determined that the NN_MODE changed before the NN register was matched, the processing returns to 303. Otherwise, the processing returns to 306. If, at 308, it is determined that the NN_MODE changed not for the current ME but the downstream ME, then neither ME could have written the register. For the current ME operating in "neighbor" mode and the downstream ME operating in "self" mode, the process searches forward 314 through the Thread/PC History until the NN_MODE of one of the MEs changes. The processing then continues by determining (at 316) if the NN_MODE changed for the current ME. If the NN_MODE changed for the current ME (thus changing the NN_MODE for the current ME to "self" mode), the processing returns to 310. If the NN_MODE changed for the downstream ME (changing it to "neighbor" mode so that both MEs are in "neighbor" mode), the processing returns to 303. If, back at 302, it is determined that only one of the MEs is operating in "neighbor" mode, and it is determined (at 318) that the current ME is in "self" mode, the process goes to 310. If, on the other hand, the ME in "self" mode in the downstream ME, the process goes to 314.

At 300, and also referring now to FIG. 15C, if it is determined that the user selected a "Go to next read . . . " for a neighbor register source operand, the process performs a forward search 320 in the current microengine's Thread/PC History (since a NN register cannot be read by any other ME than the one that owns the register). Once a match is found, the process activates 322 the thread window and changes the cycle of interest to the cycle of the new instruction of interest.

Register history must be collected for the CTX_EN-ABLES CSR in order to properly support cases where the application changes the value of the NN_MODE bit at run-time.

Consider now the search scenarios for registers other than NN registers. Referring first to FIG. 15D, if the process determines 330 if the received option selection involves a transfer register. If it does not, some other type of search is performed (as will be described later with reference to FIG. 15G). If the option selection is for a transfer register, the process determines 334 if the transfer register is a read transfer register. If the transfer register is determined to be a read transfer register, the process determines 336 if the user selected the option "Go to previous write . . . " for a read transfer register used as a source operand. If so, the user is brought to the last I/O instruction that initiated a write to the read transfer register. It is noted that non-I/O instructions (e.g., ALU) cannot write to a read transfer register. Therefore, only the Reference History needs to be searched for a matching read transfer register address. However, since certain types of instructions supported by the processor 12 (e.g., "reflector" and read I/O instructions that use an indirect_ref optional token) can cause a write to any arbitrary read transfer register in any ME, the Reference History for all MEs must be searched.

Thus, the process determines 338 from the Register History for the selected register the cycle count of the last change event recorded for the read transfer register. The cycle count establishes a limit for the backward search. The process 340 searches backwards in the Reference History of all MEs for up to the number of cycles of the cycle count to find the last I/O instruction that initiated a write to the read transfer register write (to find a matching read transfer register address). Once a match is found, the process activates the thread window for the ME that issued the I/O instruction with the matching read transfer register address and changes the cycle of interest to the cycle of that I/O instruction (at 342).

Turning to FIG. 15E, when the user selects as an alternative option a "Go to next read . . . " for a read transfer register used as a source operand or for a read transfer register referenced in an I/O "read" instruction in any ME (e.g., a reflector instruction, as mentioned earlier), the user is brought to the instruction in the ME that owns the read transfer register where the register is next used as a source operand. Using the read transfer register address determined earlier, the process performs a forward search through the Thread/PC History of the ME that owns the read transfer register for an instruction that next uses the read transfer register as a source operand. The process also performs a forward search 344 through the Thread/PC History of all MEs to find an I/O read instruction that next writes the read transfer register. If the I/O read instruction is found first, then the register was written before being used as a source operand. Once the process finds an instruction with a matching register address, it activates 346 the appropriate thread window and changes the cycle of interest to the cycle of that I/O instruction.

Referring now to FIG. 15F, if the transfer register is a write transfer register, and it is determined (at 350) that the user selected as an option the "Go to previous write . . . " for a write transfer register referenced in an I/O "write" instruction in any ME, the user is brought to the non-I/O instruction in the ME that owns the write transfer register where the register was last used as a destination. Note that only the owning ME could have written to the write transfer register, and only through a non-I/O instruction. Thus, the process searches 352 to find the non-I/O instruction (in the ME that owns the write transfer register) in which the write transfer register with a matching address was last used as a destination. Once an instruction is found with a matching register address, the process activates 354 the appropriate thread window is activated and changes the cycle of interest to the cycle of that instruction.

If, on the other hand, the user selected as an option the "Go to next read . . . " for a write transfer register used as a destination in a non-I/O instruction, or for a write transfer register referenced in an I/O "write" instruction in any ME (again, the I/O instruction may be a reflector instruction), the user is brought to the next I/O "write" instruction in any ME that referenced the write transfer register. The process searches 355 to find the next I/O write instruction in any ME that referenced the write transfer register with a matching address. Once the register address is matched, process activates the appropriate thread window and adjusts the cycle of interest (as indicated by reference numeral 354).

For registers other than NN registers and transfer registers, the process operates as follows. The process determines 356 if the selected option was a "Go to previous write . . . " option. If the selected option was "Go to previous write . . . ", the process searches backwards 357 through the PC History of the current ME until an instruction with a matching register address is found. If, alternatively, the option was a "Go to next read . . . " option, the process instead searches 358 in a forward direction to find a match. As described in the other cases, once a match is found the process activates 359 the appropriate thread window and changes the cycle of interest accordingly.

Thus, all processor instruction sequences are converted to identify results and source operand registers and variables. A history of instruction program counters, register and memory values from simulation is saved. When, at a given simulation cycle, a source operand is selected, the PC History is followed backward to the most recent instruction in the simulation history that set the value of that operand. The thread window is shifted and centered at that instruction. The reverse is done for going forward in the PC History. In the forward case, the user can hop through the series of instructions or code lines that first use the result value of a given instruction. Each time the thread window is repositioned and centered.

Other window displays are automatically updated when the history cycle changes due to a jump to previous or next instruction during operand tracing. The user can quickly switch to the other window views, such as Thread History, individual thread status, memory queue displays and memory watch windows. A more detailed description of at least one possible embodiment of the various windows, including the Thread History, is provided in U.S. Pat. No. 6,611,276, in the name of Muratori et al.

The Operand Navigation mechanism thus enables rapid traversal of code by following the code variables (as opposed to stepping instructions). Typically, during debug, if a variable is incorrect, the user needs to go to the line of code where that variable is set, then check the source operands of that line, and follow the incorrect source operand back. When looking at raw source code, there may be several places where the variable is set. The Operation Navigation mechanism described herein speeds this debug process by taking the user to the instruction that most recently set that variable. In other cases, the user will need to know the code that actually used the result variable of a given instruction. This mechanism provides the forward direction as well. Also, after the user has traced operands to a previous or future cycle of simulation, simulation register and memory state for that cycle may be instantly displayed by switching to other display windows that are updated with the new selected cycle in history, as described above.

The Operand Navigation process also simplifies the debugging process by identifying to the user the source operands of a particular instruction. In some cases the source operands may be indirectly specified, or otherwise not obvious.

The tracing of the Operand Navigation may be performed over many (e.g., 100,000s) of cycles of simulation. A disk backup mechanism may be employed on the event history.

Figure 16:
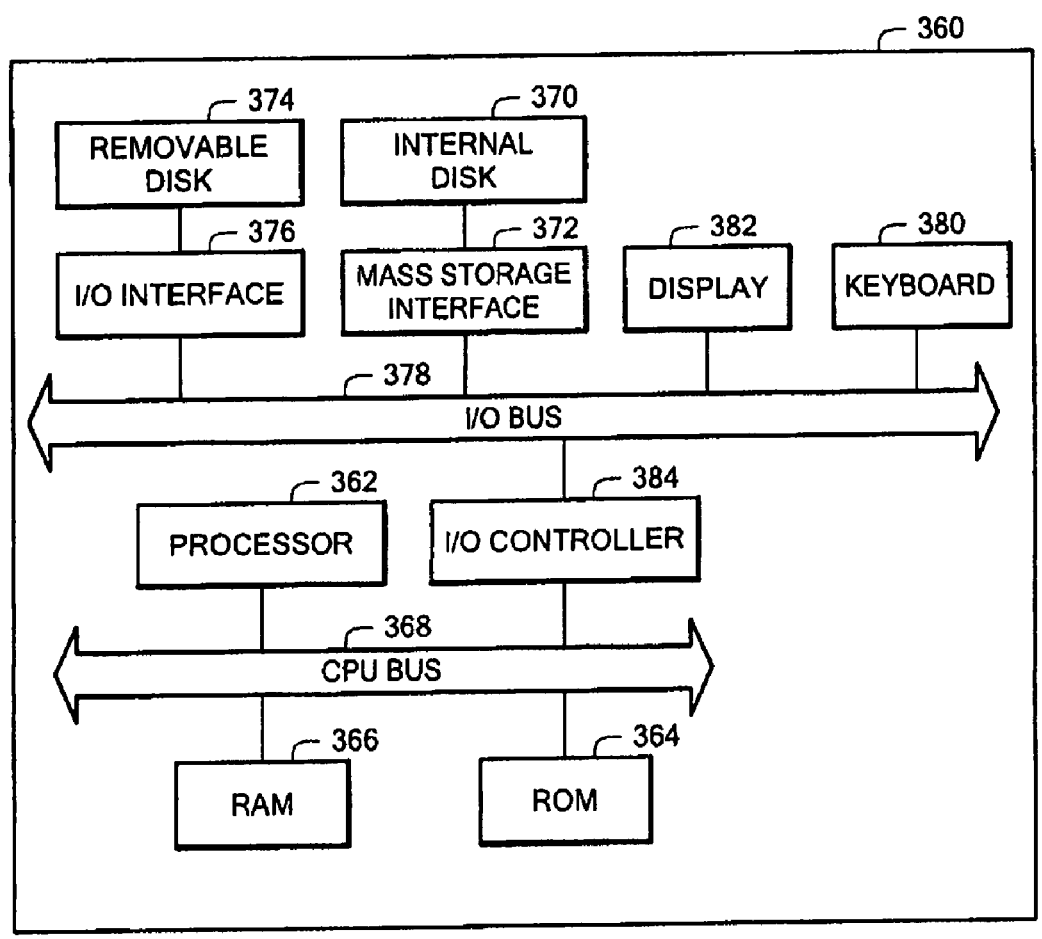
FIG. 16 is a diagram illustrating a sample computer system suitable to be programmed with embodiments of the Operand Navigation for use as the development/debugger system of FIG. 4.

Referring to FIG. 16, an exemplary computer system 360 suitable for use as system 102 (as a development/debugger system and, therefore, for supporting the Operand Navigation process and any other processes used or invoked by Operand Navigation, is shown. The Operand Navigation tool may be implemented in a computer program product tangibly embodied in a machine-readable storage device for execution by a computer processor 362; and methods of the tool may be performed by the computer processor 362 executing a program to perform functions of the tool by operating on input data and generating output.

Suitable processors include, by way of example, both general and special purpose microprocessors. Generally, the processor 362 will receive instructions and data from a read-only memory (ROM) 364 and/or a random access memory (RAM) 366 through a CPU bus 368. A computer can generally also receive programs and data fiom a storage medium such as an internal disk 370 operating through a mass storage interface 372 or a removable disk 374 operating through an I/O interface 376. The flow of data over an I/O bus 378 to and from devices 370, 374, (as well as input device 380, and output device 382) and the processor 362 and memory 366, 364 is controlled by an I/O controller 384. User input is obtained through the input device 380, which can be a keyboard, mouse, stylus, microphone, trackball, touch-sensitive screen, or other input device. These elements will be found in a conventional desktop computer as well as other computers suitable for executing computer programs implementing the methods described here, which may be used in conjunction with output device 382, which can be any display device (as shown), or other raster output device capable of producing color or gray scale pixels on paper, film, display screen, or other output medium.

Storage devices suitable for tangibly embodying computer program instructions include all forms of non-volatile memory, including by way of example semiconductor memory devices, such as EPROM, EEPROM, and flash memory devices; magnetic disks such as internal hard disks 370 and removable disks 374; magneto-optical disks; and CD-ROM disks. Any of the foregoing may be supplemented by, or incorporated in, specially-designed ASICs (application-specific integrated circuits).

Typically, the Operand Navigation tool 112 and other related processes reside on the internal disk 370. These processes are executed by the processor 362 in response to a user request to the computer system's operating system in the lower-level software 105 after being loaded into memory. Any files or records produced by these processes may be retrieved from a mass storage device such as the internal disk 370 or other local memory, such as RAM 366 or ROM 364.

The system 102 illustrates a system configuration in which the application software 104 is installed on a single stand-alone or networked computer system for local user access. In an alternative configuration, e.g., the software or portions of the software may be installed on a file server to which the system 102 is connected by a network, and the user of the system accesses the software over the network.

Other embodiments are within the scope of the following claims.

What is claimed is:

1. A method comprising:
  receiving a user selection of a first instruction from a list of instructions that executed during a processor simulation; and
  tracing an operand in the first instruction directly to a use of the operand in a second instruction in the list of instructions by following operand dependencies between such first and second instructions,
wherein tracing comprises using attributes of the first instruction to find the second instruction and using a program counter value to look up attributes of the first instruction in an instruction operand map that provides attributes of each instruction, including instruction type and type of registers used by such instruction type for operands and to determine for each register type a physical address.

2. The method of claim 1 wherein tracing determines that the second instruction set the value of the operand as used in the first instruction as a source operand.

3. The method of claim 1 wherein tracing determines that a next use of the operand, after that of the first instruction as a destination operand, occurs in the second instruction.

4. The method of claim 1 wherein receiving comprises: receiving a selected cycle corresponding to the first instruction.

5. The method of claim 4 further comprising: determining the program counter value associated with the selected cycle.

6. The method of claim 5 wherein determining the program counter value comprises looking up the program counter value in a program counter history that records state change events, which are detected during simulation, with associated program counter values for each cycle in which such state change events occurred.

7. The method of claim 6 wherein tracing further comprises: using the physical address for each register used in the first instruction to traverse the program counter history, instruction by instruction, to find a matching physical address in the second instruction.

8. The method of claim 7 wherein the microcode is intended for execution on one or more microengines in a processor simulated by the processor simulation and wherein the program counter history of more than one of the microengines is traversed.

9. The method of claim 1 wherein the instructions are instructions of a microcode and the instruction operand map is generated at microcode build time.

10. The method of claim 1 wherein determining the physical address comprises determining whether each register type is a non-I/O register or an I/O register.

11. The method of claim 10 wherein determining the physical address comprises determining whether each non-I/O register is accessed using an index register.

12. The method of claim 11 wherein the instruction operand map is used to provide the physical address for each non-I/O register that is not accessed using an index register.

13. The method of claim 12 wherein the physical address for any register determined to be an I/O register is obtained for the selected cycle from a memory reference history that records physical addresses and reference counts for each of the I/O registers that is used in a memory reference during simulation.

14. The method of claim 11 wherein the physical address for each non-I/O register that is determined to be accessed using an index register is determined by obtaining a historical value of the index register at the selected cycle from a register history that records historical values of registers for each register type as such values change during simulation.

15. The method of claim 1 wherein the instructions are intended for execution on at least one microengine of the processor simulated by the processor simulation.

16. The method of claim 15 wherein the microengine is configured to support multiple threads of execution and the instructions are intended for execution by at least one of the multiple threads of execution.

17. An article comprising:
a storage medium having stored thereon instructions that when executed by a machine result in the following:
receiving a user selection of a first instruction from a list of instructions that executed during a processor simulation; and
tracing an operand used in the first instruction directly to a use of the operand in a second instruction in the list of instructions by following operand dependencies between such first and second instructions,
wherein tracing comprises:
determining attributes of the first instruction selected by the user; and
using the attributes of the first instruction selected by the user to find the second instruction,
wherein determining attributes comprises:
using a program counter value to look up the attributes in an instruction operand map that provides attributes of each instruction, including instruction type and type of registers used by such instruction type for operands and to determine for each type of register a physical address.

18. The article of claim 17 wherein tracing determines that the second instruction set the value of the operand as used in the first instruction.

19. The article of claim 17 wherein tracing determines that a next use of the operand after that of the first instruction occurs in the second instruction.

20. A storage medium having executable instructions stored and configured to be executed by a processor, the executable instructions comprising:
executable instructions to render a window having a view of microcode instructions that executed on a processor simulator during a simulation and for which a simulation history has been collected by the processor simulator;
wherein executable instructions to render a window having the view comprises executable instructions to provide a tracing option in a menu presented to a user for one of the microcode instructions as an instruction of interest, the tracing option being usable to trace any variable used by the instruction of interest in the simulation history directly to a second instruction in which a most recent change to or next use of such variable occurred,
the executable instructions further comprising executable instructions to:
receive a user selection of the instruction of interest; and
trace an operand in the instruction of interest directly to a use of the operand in the second instruction of the microcode instructions by following operand dependencies between the instruction of interest and the second instructions,
wherein executable instructions to trace comprises executable instructions to use a program counter value to look up attributes in an instruction operand map that provides attributes of each instruction, including instruction type and type of registers used by such instruction type for operands and to determine for each type of register a physical address.

21. The storage medium of claim 20 wherein selection of the tracing option by the user causes a submenu of options available for the instruction of interest to be provided to the user, each of the options of the submenu corresponding to one of the variables used by the instruction of interest.

22. The storage medium of claim 20 further comprising executable instructions to render:

a second window in which a cycle of interest corresponding to the instruction of interest is indicated;

wherein the indication of the cycle of interest is modified to indicate a new cycle of interest corresponding to the second instruction; and wherein the window is modified to reflect the new cycle of interest.

* * * * *